United States Patent [19]

Kawaguchi et al.

[11] Patent Number: 5,268,478

[45] Date of Patent: Dec. 7, 1993

[54] SULFUR COMPOUND-COORDINATE BONDED ORGANIC COLORING MATTER, COMPOSITIONS OF SAME, AND PHOTORECORDING MEDIA CONTAINING SAME

[75] Inventors: Takeyuki Kawaguchi, Hachioji; Takashi Shiro; Katsushi Sasaki, both of Hino; Kaoru Iwata, Hachioji, all of Japan

[73] Assignee: Teijin Limited, Osaka, Japan

[21] Appl. No.: 797,137

[22] Filed: Nov. 22, 1991

[30] Foreign Application Priority Data

Nov. 30, 1990 [JP] Japan .................. 2-330144

[51] Int. Cl.$^5$ .......................... C07D 209/08
[52] U.S. Cl. ......................... 544/225; 546/8; 548/107
[58] Field of Search ............ 548/107; 546/8; 544/225

[56] References Cited

U.S. PATENT DOCUMENTS

4,767,571 8/1988 Suzuki et al. ................. 252/587

FOREIGN PATENT DOCUMENTS

| 0147083 | 7/1985 | European Pat. Off. ........ 252/587 |
| 0266164 | 5/1988 | European Pat. Off. ........ 252/587 |
| 3927872 | 7/1985 | Fed. Rep. of Germany ... 252/587 |
| 2471714 | 6/1981 | France .......................... 252/587 |

*Primary Examiner*—Mary C. Lee
*Assistant Examiner*—Joseph K. McKane
*Attorney, Agent, or Firm*—Burgess, Ryan & Wayne

[57] ABSTRACT

A sulfur compound-coordinate bonded organic coloring matter, having a high resistance to ultraviolet rays and usable for a photorecording medium, comprises a reaction product of a transition metal complex of the formula:

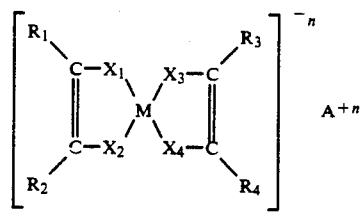

wherein n is zero, 1 or 2, A is a cation when n is 1 or but when n is zero, no cation A exists, $X_1$, $X_2$, $X_3$ and $X_4$ are —O—, —S—, —SH—, —NH— or —NH$_2$—, $R_1$, $R_2$, $R_3$ and $R_4$ are an unsubstituted or substituted phenyl, cyano or alkyl, optionally the groups of the formulae

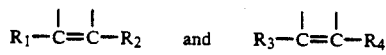

are cyclized to form a substituted or unsubstituted phenylene or naphthylene or divalent heterocyclic ring containing O, S or N, and M is a transition metal atom having a coordinate number of 4 or more, with an organic sulfur compound having a mercapto or disulfide radical, to form at least one coordinate bond between the transition metal atom M and the mercapto or disulfide radical.

31 Claims, No Drawings

SULFUR COMPOUND-COORDINATE BONDED ORGANIC COLORING MATTER, COMPOSITIONS OF SAME, AND PHOTORECORDING MEDIA CONTAINING SAME

BACKGROUND OF THE INVENTION

1) Field of the Invention

The present invention relates to an organic coloring matter, a composition comprising the organic coloring matter and a photo-recording medium comprising the organic coloring matter.

More particularly, the present invention relates to an organic coloring matter having an excellent resistance to ultraviolet rays, and a satisfactory resistance to near infrared rays and heat, a composition containing the organic coloring matter, and a photo-recording medium containing the organic coloring matter.

2) Description of the Related Arts

Recently, many inventions have been proposed for photo-recording media containing organic coloring matter enabling a recording and erasing of the record, which are nonpoisonous and cheap, in comparison with conventional inorganic photo-recording media.

These photo-recording media are classified into three groups.

The first group consists of photo-recording media composed of a substrate and a coating layer formed on the substrate, and comprising a coloring matter sublimated or melted by irradiating a recording a laser beam thereto in accordance with digital signals, to form pits corresponding to those signals in the coating layer.

The information recorded in the coating layer can be read by irradiating a reading laser beam to the coating layer, and detecting differences in the reflectance of the laser beam between the pitted portions and non-pitted portion of the coating layer.

The second group consists of photo-recording media composed of a substrate and a coating layer formed on the substrate, and comprising a mixture of a coloring matter and a resinous material. When a recording laser beam is irradiated to this coating layer, the resinous material is melted or decomposed to form recording pits in the coating layer.

The third group consists of erasable photorecording media composed of a substrate, and a coating layer formed on the substrate and comprising a coloring matter and a resinous material. By irradiating a recording laser beam in accordance with digital signals corresponding to the information to be recorded, pits or bumps are formed to contain the information in the recording layer, and that information can be read by irradiating a reading laser beam. Also, the recorded information can be erased by irradiating an erasing laser beam on the recorded coating layer, and erasing the pits or bumps.

In the above-mentioned photo-recording media, the coloring matter has the following functions.

In the recording step, the coloring matter absorbs the recording laser beam and converts the absorbed energy of the laser beam to heat. This heat serves to form pits or bumps in the recording layer.

Also, in the reading step, the coloring matter in the coating layer reflects the reading laser beam applied to the coating layer.

Further, depending on the type of recording media, the phase or chemical constitution of the coloring matter per se is changed in the recording step.

Accordingly, the coloring matter to be contained in the photorecording media must have an absorption band and a reflection band in the oscillator wavelength ranges of the recording laser beam and the erasing laser beam. Also, the coloring matter must have a high chemical stability so that, in a re-recording type media, the coloring matter exhibits a high durability to repeated reading operations, and in an erasable type media, the coloring matter exhibits a high durability to repeated recording and erasing operations.

Typical near infrared ray-absorbing coloring matters having a high durability and exclusively usable for recording-erasing type media are naphthalocyanine compound coloring matters as disclosed in Japanese Unexamined Patent Publication Nos. 61-177,287, 61-177,288, 64-11,982, 63-227,387, 64-4,389, 64-77,582, 1-145,195 and 2-663, phthalocyanine compound coloring matters as disclosed in Japanese Unexamined Patent Publication Nos. 1-130,984, 1-138,905 and 1-130,980, and stabilized cyanine dye complex coloring matters in which a cyanine dye compound cation is stabilized by a paired specific transition metal complex anion, as disclosed in Japanese Unexamined Patent Publication Nos. 60-103,532, 61-8,384, 61-11,294, 61-16,891, 62-14,345, 2-3,374 and 2-4,580.

Generally, the conventional naphthalocyanine and phthalocyanine compounds exhibit a very poor solubility in an organic solvent, and thus a plurality of synthesizing steps are necessary to convert these compounds to organic solvent-soluble compounds.

Also, although the conventional stabilized cyanine dye complex coloring matters exhibit an enhanced resistance to near infrared rays and to heat, in comparison with the non-stabilized cyanine dye compounds, they are disadvantageous in that they have a poor resistance to ultraviolet rays, and thus are easily deteriorated to the same extent as the conventional non-stabilized cyanine dye compound.

Accordingly, when a recording layer is provided by using a composition comprising the conventional stabilized cyanine dye complex coloring matter and a resinous material capable of being cross-linked by an ultraviolet ray irradiation, the resultant photorecording media is disadvantageous in that the recording property of the coating layer is deteriorated when the resinous material is cured by the irradiation of ultraviolet rays.

Also, it is impossible to avoid the deterioration of the conventional coloring matter in the coating layer when ultraviolet rays are applied to cure a bonding resin layer, protective resin layer or sealing resin layer of the photorecording media.

SUMMARY OF THE INVENTION

An object of the present invention is to provide a sulfur compound-coordinate bonded organic coloring matter having an excellent resistance to ultraviolet rays, compositions of same, and photorecording media containing same.

The above-mentioned object can be attained by the sulfur compound-coordinate bonded organic coloring matter of the present invention with a high resistance to ultraviolet rays, which comprises a coordinate bonding reaction product of a transition metal complex of the formula (I):

$$B^{-n} \cdot A^{+n} \quad (I)$$

wherein n represents zero or an integer of 1 or 2, A represents a cation moiety when n is 1 or 2, but when n is zero, no cation moiety A exists, and B represents an anion moiety of the formula (II):

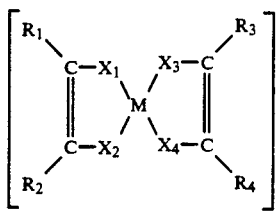

in which $X_1$, $X_2$, $X_3$ and $X_4$ respectively and independently from each other represent a member selected from the group consisting of sulfur and oxygen atoms and —SH—, —NH— and —NH$_2$ radicals; $R_1$, $R_2$, $R_3$ and $R_4$ respectively and independently from each other represent a member selected from the group consisting of unsubstituted and substituted phenyl radicals, a cyano radical and alkyl radicals, optionally the groups of the formulae:

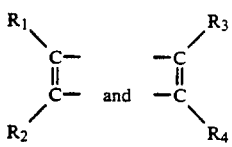

being respectively and independently from each other cyclized to form a cyclic structure selected from the group consisting of unsubstituted and substituted phenylene and naphthylene structures and unsubstituted and substituted divalent heterocyclic structures having at least one member selected from the group consisting of nitrogen, sulfur and oxygen atoms; and M represents a transition metal atom having a coordinate number of 4 or more, with an organic sulfur compound having at least one ligand radical selected from the group consisting of mercapto and disulfide radicals, in which reaction product the transition metal atom M in the compound of the formula (I) is coordinate-bonded with at least one of the above-mentioned ligand radicals of the organic sulfur compound.

The composition of the present invention comprises the sulfur compound-coordinate bonded organic coloring matter as mentioned above and at least one transition metal complex of the formula (I) which is not coordinate bonded with the organic sulfur compound.

The resinous composition of the present invention comprises the sulfur compound-coordinate bonded organic coloring matter as mentioned above and a resinous material.

The photorecording medium of the present invention has a photorecording layer comprising the above-mentioned resinous composition containing the sulfur compound-coordinate bonded organic coloring matter, and formed on a substrate.

DESCRIPTION OF THE PREFERRED EMBODIMENTS

The sulfur compound coordinate bonded organic coloring matter of the present invention has an excellent resistance to ultraviolet rays and comprises a coordinate bonding reaction product of a transition metal complex of the formula (I) with a sulfur compound having at least one ligand radical selected from the group consisting of mercapto (—SH) radical and disulfide (—S—S—) radicals.

In the formula (I):

$$B^{-n} \cdot A^{+n} \quad (I)$$

n represents zero, 1 or 2, A represents a cation moiety when n is 1 or 2, but when n is zero, no cation moiety exists, and B represents an anion moiety of the formula (II) paired with the cation moiety A. When n is zero, the moiety B is not ionized.

In the formula (II):

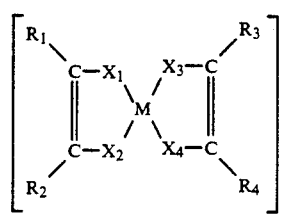

M represents a transition metal atom having a coordinate number of 4 or more, preferably 5 or more, more preferably 5 or 6, $X_1$, $X_2$, $X_3$ and $X_4$ respectively and independently from each other a member selected from the group consisting of oxygen or sulfur atoms and —SH—, —NH— and —NH$_2$— radicals which are serve as ligand radicals to the transition metal atom M, and $R_1$, $R_2$, $R_3$ and $R_4$ respectively and independently from each other represent a member selected from the group consisting of unsubstituted and substituted phenyl radicals, for example, phenyl, p-N,N-dimethylaminophenyl, p-N,N-diethylaminophenyl, p-methoxyphenyl, p-chlorophenyl, p-methylphenyl and p-ethylphenyl, a cyano radical and alkyl radicals, preferably having 1 to 4 carbon atoms, for example, methyl, ethyl, propyl and butyl.

In the formula (II), optionally the groups of the formulae:

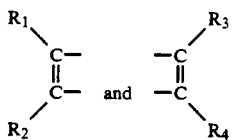

respectively and independently from each other, are cyclized to form a cyclic structure selected from the group consisting of unsubstituted and substituted phenylene and naphthylene structures and unsubstituted and substituted divalent heterocyclic structures having at least one ring-forming element selected from the group consisting of nitrogen, sulfur and oxygen atoms.

The substituent for the substituted phenylene and naphthylene structures is preferably selected from —Cl, —CH$_3$, —N(CH$_3$)$_2$, —(C$_2$H$_5$)$_2$, —OCH$_3$, —NH$_2$ and —C$_2$H$_5$ radicals.

Further, the heterocyclic structures is preferably selected from

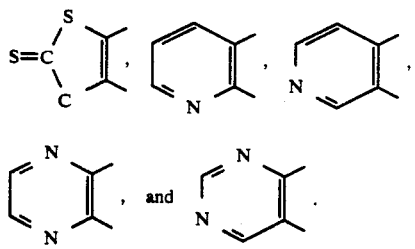

The sulfur compound-coordinate bonded organic coloring matter of the present invention preferably has a light-absorption band in the near infrared ray region.

In the formula (I), the cation moiety A is preferably selected from the group consisting of cyanine dye compound cations polymethine dye compound cations, pyrylium compound cations, thiapyrylium compound cations and aminium dye compound cations.

In the formula (II), the transition metal atom M is preferably selected from the group consisting of Ni, Co, Pt, Pd, Fe, Zn and Cu atoms having a coordination number of 4 to 6.

The organic sulfur compound usable for the present invention has at least one mercapto and/or disulfide radical and is preferably selected from the group consisting of alkyl mercaptans, preferably having 1 to 20 carbon atoms, for example, methyl mercaptan, ethyl mercaptan, propyl mercaptan, butyl mercaptane, hexyl mercaptan, heptyl mercaptan, decylmercaptane, dodecyl mercaptan, hexadecyl mercaptan, and octadecyl mercaptan, aralkyl mercaptans, for example, dodecylbenzyl mercaptan and p-ethylphenyl mercaptan, dimercaptoalkanes, preferably having 2 to 20 carbon atoms, for example, 1,2-dimercaptoethane, 1,2-dimercaptopropane, 1,3-dimercaptopropane, 1,4-dimercaptobutane, 1,6-dimercaptohexane and 1,10-dimercaptodecane, 1,4-dimercapto-2,3-butanediol, di(2-mercaptoethyl)ether, 2,3-dimercapto-1-propanol, and 2,3-dimercapto succinic acid, polymercapto compounds, for example, pentaerythritol tetra(3-mercaptoacetate), and pentaerythritol tetra(3-mercaptopropionate), dialkylsulfides, preferably having 2 to 20 carbon atoms, for example, diethyl sulfide, dipropylsulfide, dibutylsulfide, and dipentylsulfide, 2-marcaptobenzothiazole, dibenzothiazyldisulfide, tetramethylthiuramdisulfide, tetraethylthiuramdisulfide, tetrabutylthiuramdisulfide, 2-mercaptomethyl benzimidazole, 2-mercaptobenzimidazole, 4,4'-dithiomorpholine, and o,o'-dibenzamidodiphenyldisulfide.

The specific transition metal complex of the formula (I) $(B^{-n}.A^{+n})$ can be prepared by a paired ion-exchange reaction, as disclosed in Japanese Unexamined Patent Publication No. 60-162,691, of the following formula:

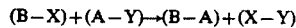

wherein A and B are defined as above, X represents a cation, for example, ammonium ions, and Y represents an anion, for example, $I^-$, $Br^-$, $Cl^-$ or $ClO_4^-$.

By exchanging the cation X by the cation A, for example, a cyanine dye compound cation or aminium compound cation in accordance with the above reaction, the light absorption and reflection properties of the coloring matter can be adjusted to desired levels.

The paired ion-exchange reaction is preferably carried out at a temperature of 60° C. to 90° C., more preferably 70° C. to 80° C., for 1 to 4 hours, more preferably 2 to 3 hours in an organic solvent comprising, for example, dimethylformamide or dimethylacetamide, in an inert gas atmosphere, for example, nitrogen gas atmosphere under the ambient atmospheric pressure.

After the reaction is completed, the reaction mixture is cooled to room temperature, and then mixed with ice water in an amount by weight of 10 times the reaction mixture, to allow the reaction product to precipitate.

The resultant precipitate is filtered and washed with water. This filter-washing operation is repeated four times. Then the reaction product $(B^{-n}.A^{+n})$ is recrystallized from a mixed solvent preferably consisting of 1 part by weight of ethyl alcohol and 1 part by weight of dimethylformamide.

The precursory transition metal complex of the formula B-X usable for the preparation of the transition metal complex of the formula I $(B^{-n}.A^{+n})$ is preferably selected from the following compounds.

| Compound No. | Formula |
|---|---|
| (1) | ![structure] $N^{\oplus}(C_3H_7)_4$, |
| (2) | ![structure] $N^{\oplus}(C_3H_7)_4$, |
| (3) | ![structure] $N^{\oplus}(C_4H_9)_4$, |

-continued
| Compound No. | Formula |
|---|---|
| (4) | 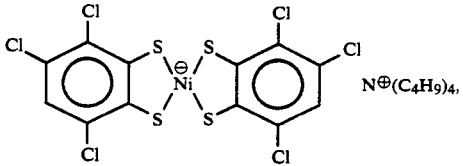 N⊕(C₄H₉)₄, |
| (5) | 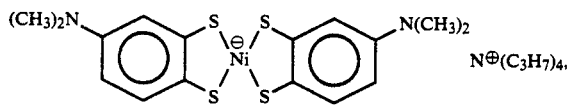 N⊕(C₃H₇)₄, |
| (6) | 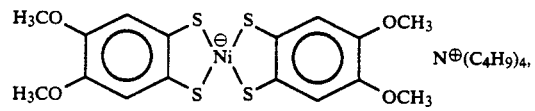 N⊕(C₄H₉)₄, |
| (7) | 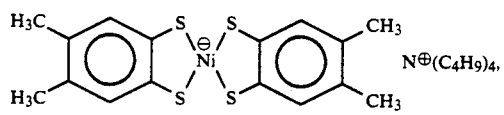 N⊕(C₄H₉)₄, |
| (8) | 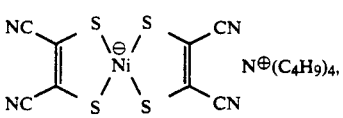 N⊕(C₄H₉)₄, |
| (9) | 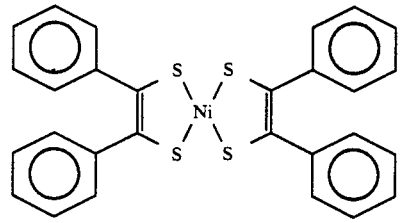 |
| (10) | 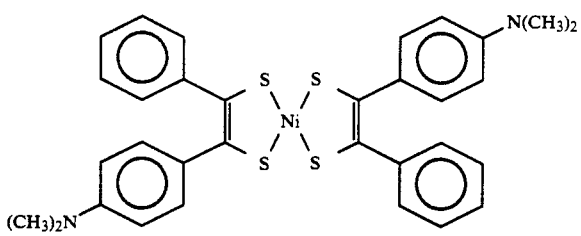 |
| (11) | 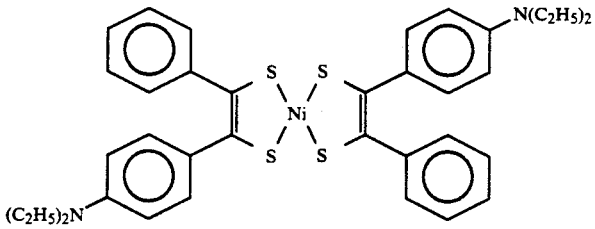 |
| (12) | 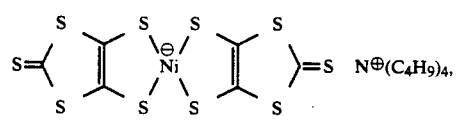 N⊕(C₄H₉)₄, |

-continued

| Compound No. | Formula |
|---|---|

(13)

[Structure: Ni complex with two benzene rings bearing NH/NH$_2$ groups; one ring substituted with C$_4$H$_9$, other with NH$_2$]

(14)

[Structure: Ni complex with two benzene rings bearing NH/NH$_2$ groups; both rings substituted with C$_2$H$_5$ (H$_5$C$_2$ and C$_2$H$_5$)]

(15)

[Structure: Ni bis(dithiolene) complex with four phenyl substituents], N$^+$(C$_4$H$_9$)$_4$, (16)

[Structure: Ni bis(dithiolene) complex with four 4-methoxyphenyl substituents], N$^{\oplus}$(C$_4$H$_9$)$_4$, (17)

[Structure: Ni bis(dithiolene) complex with two phenyl and two 4-(dimethylamino)phenyl substituents], N$^{\oplus}$(C$_4$H$_9$)$_4$, (18)

[Structure: Ni bis(dithiolene) complex with two methyl and two phenyl substituents], N$^{\oplus}$(C$_4$H$_9$)$_4$, (19)

[Structure: Ni complex with two naphthalene-dithiolate ligands], N$^{\oplus}$(C$_4$H$_9$)$_4$,

| Compound No. | Formula |
|---|---|
| (20) | [3,5-dichlorobenzene-thiolate/phenolate Ni complex]$^{\ominus}$ |
| (21) | [methyl-naphthalene-thiolate/olate Ni complex]$^{\ominus}$ |

The compound of the formula A-Y usable for the preparation of the complex of the formula (I), $B^{-n} \cdot A^{+n}$ is preferably selected from the following compounds.

| Compound No. | Formula |
|---|---|
| | (i) Cyanine dye compounds |
| (22) | Indolenine trimethine cyanine, N-CH$_3$, I$^{\ominus}$ |
| (23) | Indolenine trimethine cyanine, N-CH$_3$, ClO$_4^{\ominus}$ |
| (24) | Indolenine trimethine cyanine, N-C$_2$H$_5$, I$^{\ominus}$ |
| (25) | 5-Chloro indolenine trimethine cyanine, N-CH$_3$, ClO$_4^{\ominus}$ |
| (26) | Benzoxazole trimethine cyanine, N-C$_2$H$_5$, I$^{\ominus}$ |

-continued

| Compound No. | Formula |
|---|---|
| (27) | |
| (28) | |
| (29) | |
| (30) | |
| (31) | |
| (32) | |
| (33) | |
| (34) | |

| Compound No. | Formula |
|---|---|
| (35) | 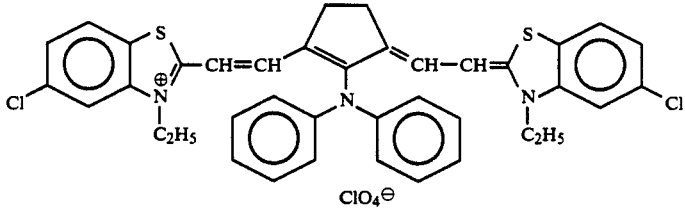 |
| (36) | 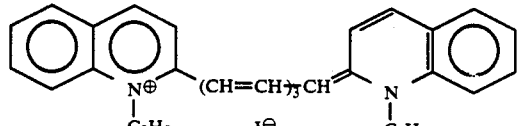 |
| (37) | 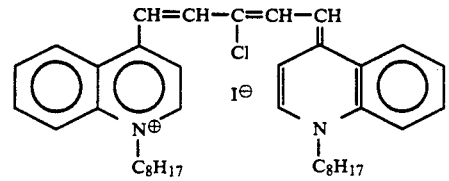 |
| (38) | 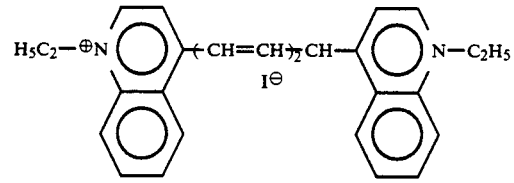 |
| (39) | 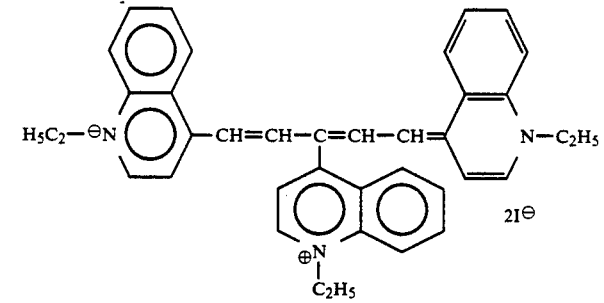 |
| (40) | 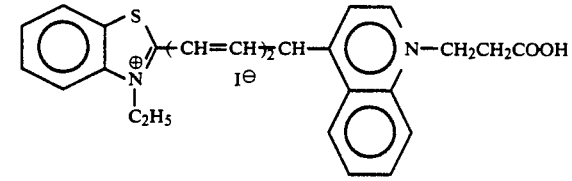 |
| (41) | 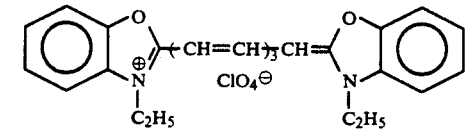 |
| (42) | 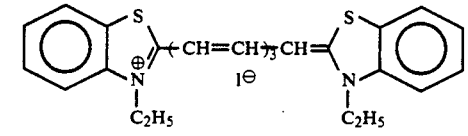 |

-continued
| Compound No. | Formula |
|---|---|
| (43) | 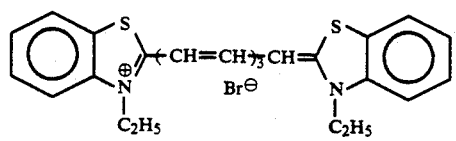 |
| (44) | 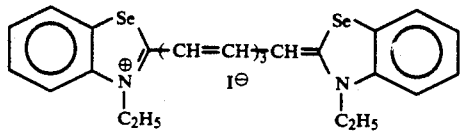 |
| (45) | 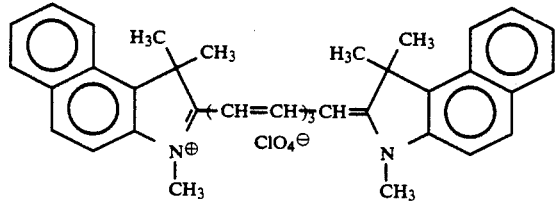 |
(ii) Polymethine dye compound
| | |
|---|---|
| (46) | 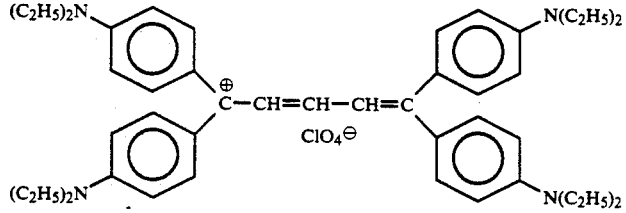 |
| (47) | 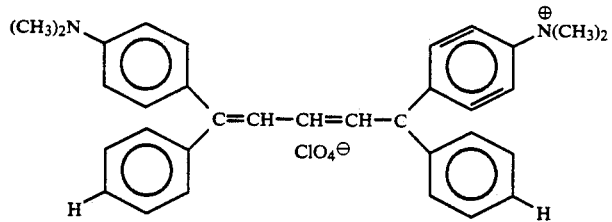 |
| (48) | 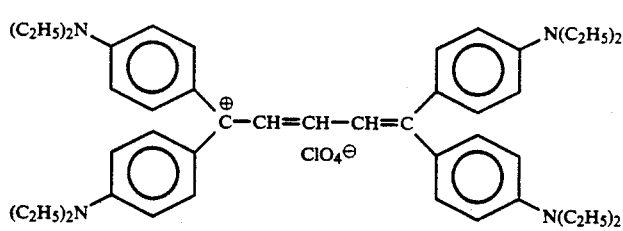 |
| (49) | 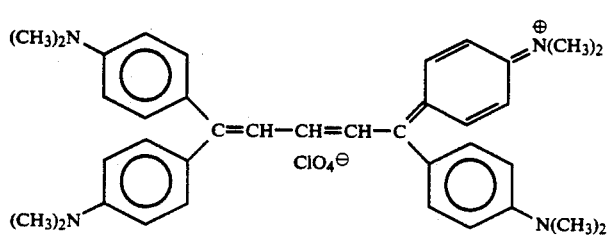 |
(iii) Pyrylium and thio pyrylium salt compound -continued
| Compound No. | Formula |
|---|---|
| (50) | 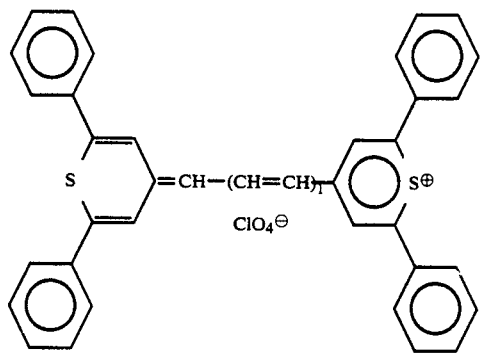 |
| (51) | 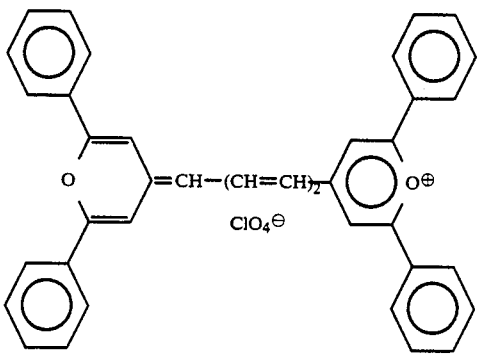 |
(iv) Aminium compounds
| | |
|---|---|
| (52) | 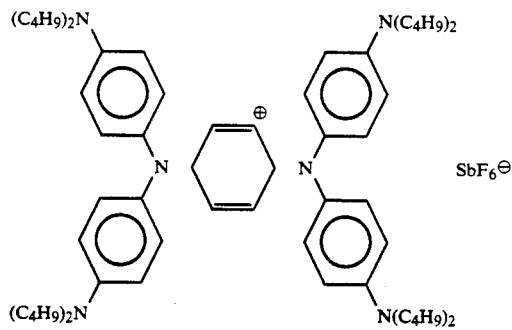 |
| (53) | 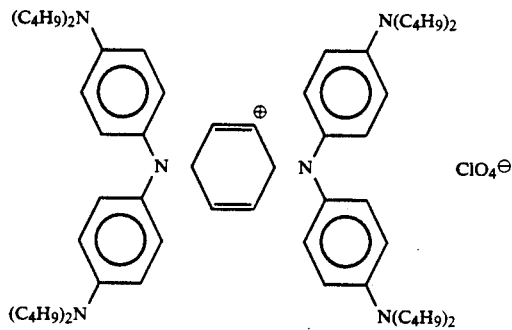 |

| Compound No. | Formula |
|---|---|
| (54) | 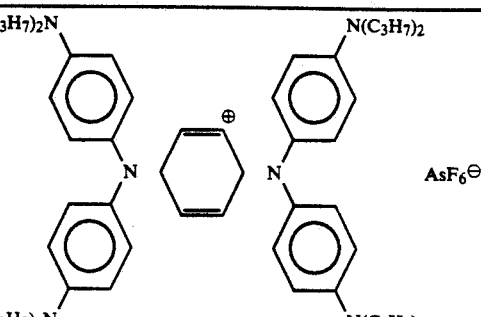 |

As mentioned above, the transition metal complex of the formula (I) usable for the present invention can be prepared by the paired ion-exchange reaction of the transition metal complex of the formula B-X, for example, selected from the compounds (1) to (21) with the compound of the formula A-Y, for example, selected from the compounds (22) to (54).

For example, when the compound (22), available under the trademark of NK-125 from Nihon Kankoshikiso Kenkyusho K. K., is reacted with the compound (4), available under the trademark of PA-1006 from Mitsui Toatsu K. K., the resultant complex has a melting point of 205° C.

Also, it is confirmed by an element analysis that the reaction product is of the formula:

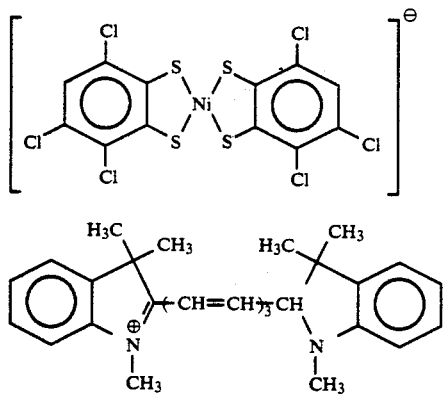

The sulfur compound-coordinate bonded organic coloring matter of the present invention can be prepared by a coordinate bonding reaction of the transition metal complex of the formula (I) with an organic sulfur compound having at least one ligand radical, selected from mercapto and disulfide radicals. In the resultant reaction product, the transition metal atom M is coordinate bonded with at least one of the above-mentioned ligand radicals of the organic sulfur compound.

The coordinate bonding reaction can be carried out by dissolving a transition metal complex of the formula (I) in an organic solvent, for example, chloroform or methylethyl ketone, and mixing the transition metal complex solution with an organic sulfur compound, while agitating the resultant reaction mixture at a temperature of from 20° C. to 80° C., preferably at room temperature. Then, the resultant reaction mixture is subjected to an evaporation operation to remove the solvent and to collect resultant solid crystals. The solid crystals are refined by washing with an organic solvent, for example, ethyl alcohol.

When the sulfur compound is a polyfunctional mercaptan compound, the coordinate bonding reaction can be effected only by mixing the transition metal complex of the formula (I) with the polyfunctional mercaptan compound at a temperature of from 20° C. to 40° C., preferably at room temperature.

The sulfur compound-coordinate bonded organic coloring matter of the present invention preferably has a solubility of 0.1 to 5.0% by weight, more preferably 0.5 to 3.0% by weight, in an organic solvent.

Even if the sulfur compound-coordinate bonded organic coloring matter per se is insoluble in the organic solvent, if the precursory transition metal complex of the formula (I) is soluble in the organic solvent and is capable of easily coordinate bonding with the organic sulfur compound, the sulfur compound-coordinate bonded organic coloring matter can be synthesized by applying a mixture of the precursory transition metal complex of the formula (I) with the sulfur compound to a substrate of a photorecording media and causing the precursory complex to react with the sulfur compound within the photorecording media.

Also, when used for the photorecording media, preferably the sulfur compound-coordinate bonded organic coloring matter of the present invention exhibits a light absorption in a near infrared region.

To obtain this high near infrared ray absorption, the transition metal atom M is preferably a nickel atom.

The sulfur compound-coordinate bonded organic coloring matter of the present invention can be used in the form of a composition comprising the above-mentioned sulfur compound-coordinate bonded organic coloring matter and at least one transition metal complex of the formula (I) which is free from the organic sulfur compound.

In this composition, preferably the ratio of the total molar amount of the sulfur compound-coordinate bonded organic coloring matter and the transition metal complex of the formula (I) to the molar amount of the ligand radicals of the sulfur compound coordinate bonded to the transition metal atom is from 1:1/20 to 1:2, more preferably 1:1/10 to 1:1.

The above-mentioned composition can be prepared by subjecting a reaction mixture comprising one molar part of a transition metal complex of the formula (I) and an organic sulfur compound having 1/20 to 2 molar parts, preferably 1/10 to 1 molar part, of at least one ligand radical selected from mercapto and disulfide radicals and dissolved in an organic solvent, to a coordinate bonding reaction.

Also, the sulfur compound-coordinate bonded organic coloring matter of the present invention can be used in the form of a composition comprising the above-mentioned sulfur compound-coordinate bonded organic coloring matter and at least one compound of the formula A-Y selected from the group consisting of cyanine dye compounds, polymethine dye compounds, pyrylium compounds, thiapyrylium compounds, and aminium dye compounds.

The reaction product composition can be utilized for practical use, for example, a photorecording media. Also, the composition can be prepared in a photorecording layer by mixing the transition metal complex of the formula (I) with the organic sulfur compound during the formation of the photorecording layer.

Further, the sulfur compound-coordinate bonded organic coloring matter can be refined and isolated from the above-mentioned reaction product composition. In this case, the sulfur compound must be a monofunctional sulfur compound, because if the sulfur compound is polyfunctional, the resultant sulfur compound-coordinate bonded organic coloring matter is intermolecularly cross-linked, and accordingly, insoluble in organic solvent, and thus the refining and isolation of the resultant organic coloring matter is difficult.

Accordingly, if the polyfunctional sulfur compound is used for the photorecording layer, preferably, the transition metal complex of the formula (I) is mixed with the polyfunctional sulfur compound immediately before the formation of the photorecording layer and after the formation of the photorecording layer is completed, the cross-linking reaction of the transition metal complex of the formula (I) with the polyfunctional sulfur compound is carried out within the photorecording layer.

The coordinate bonding structure of the sulfur compound with the transition metal complex of the formula can be confirmed by an infrared absorption spectrum, ultraviolet-visible ray absorption spectrum, nuclear magnetic resonance spectrum, mass spectrometric analysis, liquid chromatography and/or element analysis.

The sulfur compound-coordinate bonded organic coloring matter of the present invention exhibits a high resistance and stability to ultraviolet rays.

The reason for this high ultraviolet ray stability is not fully known but it is assumed that active oxygen or ozone is generated due to an irradiation of ultraviolet rays to the organic coloring matter, and the organic sulfur compound coordinate bonded to the transition metal atom of the organic coloring matter effectively traps the active oxygen or ozone, and thus the decomposition of the organic coloring matter is prevented.

The sulfur compound-coordinate bonded organic coloring matter of the present invention is advantageously used in the state of a resinous composition containing a resinous material mixed therewith. This resinous composition containing the sulfur compound-coordinate bonded organic coloring matter of the present invention is useful for forming a photorecording layer coated on a substrate to provide a photorecording media.

Preferably, the resinous material comprises at least one polymeric material capable of being cross-linked by irradiation of an electron beam or ultraviolet rays.

Conventional coloring matters, for example, conventional azulenium, polymethine and cyanine dye compounds; transition metal dye complexes and phthalocyanine and naphthalocyanine dye compounds have an unsatisfactory resistance to ultraviolet rays. Therefore, when ultraviolet rays are applied to a resinous composition comprising the conventional coloring matter mixed with a cross-linkable polymeric material, to cross-link the polymeric material, the conventional coloring matter is deteriorated and discolored.

It was found by the inventors of the present invention that, when the sulfur compound-coordinate bonded organic coloring matter of the present invention is mixed with the conventional coloring matter, the deterioration of the conventional coloring matter by ultraviolet rays can be prevented or reduced.

Also, it was found by the inventors of the present invention that an ultraviolet ray resistance (light fastness) of basic dyes applied to a basic dye-dyable solid material, for example, a cationic dye-dyable polyester or polyamide fiber material or film can be improved by treating the basic dye-dyed solid material with the sulfur compound-coordinate bonded organic coloring matter of the present invention. In this treatment, the sulfur compound-coordinate bonded organic coloring matter is applied in the form of a solution in an organic solvent or of an aqueous emulsion or suspension.

Examples of the basic dyes capable of being given an improved ultraviolet ray resistance by the sulfur compound-coordinate bonded organic coloring matter of the present invention are as follows.

| | | |
|---|---|---|
| B1 | C.I. Basic Yellow 1 | C.I. 49005 |
| B2 | C.I. Basic Yellow 2 | C.I. 41000 |
| B3 | C.I. Basic Yellow 11 | C.I. 48055 |
| B16 | C.I. Basic Orange 2 | C.I. 11270 |
| B17 | C.I. Basic Orange 14 | C.I. 46005 |
| B18 | C.I. Basic Orange 15 | C.I. 46045 |
| B19 | C.I. Basic Orange 21 | C.I. 48035 |
| B20 | C.I. Basic Orange 22 | C.I. 48040 |
| B24 | C.I. Basic Red 1 | C.I. 45160 |
| B25 | C.I. Basic Red 2 | C.I. 50240 |
| B26 | C.I. Basic Red 9 | C.I. 42500 |
| B27 | C.I. Basic Red 12 | C.I. 48070 |
| B28 | C.I. Basic Red 13 | C.I. 48015 |
| B47 | C.I. Basic Violet 1 | C.I. 42535 |
| B48 | C.I. Basic Violet 3 | C.I. 42555 |
| B49 | C.I. Basic Violet 7 | C.I. 48020 |
| B50 | C.I. Basic Violet 10 | C.I. 45170 |
| B51 | C.I. Basic Violet 14 | C.I. 42510 |
| B64 | C.I. Basic Blue 1 | C.I. 42025 |
| B65 | C.I. Basic Blue 3 | C.I. 51005 |
| B66 | C.I. Basic Blue 5 | C.I. 42140 |
| B67 | C.I. Basic Blue 7 | C.I. 42595 |
| B68 | C.I. Basic Blue 9 | C.I. 52015 |
| B69 | C.I. Basic Blue 9 | C.I. 52015 |
| B73 | C.I. Basic Blue 24 | C.I. 52030 |
| B74 | C.I. Basic Blue 25 | C.I. 52025 |
| B75 | C.I. Basic Blue 26 | C.I. 44045 |
| B99 | C.I. Basic Green 1 | C.I. 42040 |
| B100 | C.I. Basic Green 4 | C.I. 42000 |
| B103 | C.I. Basic Brown 1 | C.I. 21000 |
| B106 | | C.I. 33505 |
| B108 | C.I. Basic Black 2 | C.I. 11825 |

As mentioned above, the sulfur compound-coordinate bonded organic coloring matter of the present invention is advantageous in that the coloring matter per se has an excellent resistance to ultraviolet rays, and in that the coloring matter of the present invention effectively prevents the deterioration of conventional coloring matters and basic dyes by ultraviolet ray irradiation.

Further, when the sulfur compound is selected from polyfunctional mercaptan compounds, the cross-linkable polymeric material can be cross-linked by the polyfunctional mercaptan compound in which the mercapto radicals serve as photosensitive cross-linking agent.

In the cross-linkable resinous composition containing the coloring matter of the present invention, the polymeric material is selected from those capable of being cross-linked by the ultraviolet ray irradiation and compatible with the coloring matter of the present invention.

The ultraviolet ray-sensitive, cross-linkable polymeric material is especially useful for photorecordable and erasable recording media, as disclosed in Japanese Unexamined Patent Publication Nos. 2-61,266 and 2-139,935.

The cross-linkable polymeric material preferably has polymerizable and cross-linkable groups, for example, allyl, acrylic, vinyl and cinnamoyl groups.

Preferable cross-linkable polymeric materials are selected from the group consisting of allyl-substituted polycarbonate resins, polyepoxyacrylate resins, novolakepoxyacrylate resins, polyurethaneacrylate resins, polyesteracrylate resins and cinnamic acid-modified phenoxy resins. These polymeric materials can be cross-linked by an irradiation of ultraviolet rays or an electron beam.

The sulfur compound-coordinate bonded organic coloring matter of the present invention can be used together with a non-cross-linkable polymeric material, for example, a thermoplastic polymeric material such as polymethyl methacrylate resin, or a thermosetting polymeric material such as an epoxy resin.

In an embodiment, the photorecording media is composed of a single recording layer comprising the coloring matter of the present invention and the resinous material. In another embodiment, the photorecording media as disclosed in Japanese Unexamined Patent Publication No. 60-69,846, is composed of a support and an expanding layer formed from a resinous composition of the present invention on the support.

In the resinous composition of the present invention, the sulfur compound-coordinate bonded organic coloring matter of the present invention is preferably present in an amount of 2 to 30%, more preferably 5 to 20%, based on the weight of the resinous material.

The resinous composition of the present invention optionally contains a photo-polymerization-initiating agent comprising at least one member selected from the group consisting of, for example, benzophenone compounds such as benzophenone and Michler's ketone (N,N'-tetramethyl-4,4,-diaminobenzophenone; diketone compounds such as benzylphenylmethoxydiketone; benzoin compounds such as benzoinethylether and benzyldimethylketal; thioxanthone compounds such as 2,4-diethylthioxanthone; and quinone compounds such as 2-methylanthraquinone and camphorquinone.

Further, the resinous composition of the present invention optionally contains an accelerator for the photo-crosslinking reaction of the resinous material, comprising, for example, N,N-diethylaminobenzene derivatives.

To produce a photo-recording media, the resinous composition comprising the sulfur compound-coordinate bonded organic coloring matter of the present invention and the resinous material is coated on a substrate and then cured (cross-linked).

There is no specific limitation of the material used for forming the substrate, but usually the substrate is formed from a member selected from polycarbonate, polymethylmethacrylate, poly-4-methylpentene-1 and glass discs and polyester films.

After a solution of the resinous composition is coated on a substrate and the resultant solution layer is dried, an ultraviolet ray irradiation is applied to the resultant resinous composition layer, to cross-link the resinous material and to provide a photo-recording layer.

The coating operation can be carried out by a customary method, for example, spin coating method, dip coating method, roll coating method, gravure coating method or spray coating method.

The thickness of the photo-recording layer varies, depending on the type of the resinous material, and preferably is from 0.1 to 5 μm, more preferably from 0.2 to 3 μm. The ultraviolet ray irradiation is preferably carried out after a heat treatment is applied to the solution layer, to completely remove the solvent and to form a dry resinous composition layer.

The source of the ultraviolet rays is selected from customary ultraviolet ray-generating lamps, for example, mercury vapor lamps, middle pressure mercury vapor lamps, high pressure mercury vapor lamps, and methyl halide vapor lamps. The irradiation energy to be applied to the resinous composition layer varies, depending on the type of the resinous material; when ultraviolet rays are used, the irradiation energy is preferably 0.5 to 5 J/cm$^2$, more preferably 1 to 3 J/cm$^2$.

The irradiation time varies, depending on the output of the ultraviolet ray source and the photoreaction rate of the resinous material, but usually the irradiation time is from one second to one hour, preferably from 10 seconds to 30 minutes.

When photo-information is written in the photorecording media containing the sulfur compound-coordinate bonded organic coloring matter of the present invention, a writing light is applied to the photorecording layer of the recording media in the form of a disc, while rotating the disc. The record signals are written on flat portions or grooved portions of the photorecording layer. Namely, record pits or bumps are formed on the photorecording layer in accordance with the record signals. The record pits can be read by irradiating a light to the recording layer and detecting the difference in reflected light volume, while rotating the photo-recording media.

The record pits can be erased by irradiating a defocus light or continuous beam light, or by applying a heat treatment thereto.

The light used for the recording, erasing and re-recording is preferably a semiconductor laser.

The organic coloring matter of the present invention in which an organic sulfur compound having mercapto and/or disulfide radicals is coordinate bonded to a transition metal complex coloring matter of the formula (I), has an excellent resistance and stability to ultraviolet rays.

The organic coloring matter of the present invention also exhibits an excellent stability to near infrared rays and heat.

The organic coloring matter of the present invention is useful for providing a photo-recording media.

This photo-recording media has a superior resistance to ultraviolet rays, and thus exhibits an excellent stability when stored in the open air or indoors under a natural light. Also, the photorecording media has a satisfactory stability for near infrared rays and heat, similar to conventional photorecording media containing the transition metal complex of the formula (I), and accordingly, the coordinate bonding of the sulfur compound to the transition metal complex of the formula (I) does not lead to any disadvantages with the resultant organic coloring matter or the photorecording media.

Even when an ultraviolet ray irradiation is applied to the photorecording media for the production or terminal seating thereof, no deterioration of the photorecording property of the media occurs, whereas the photorecording property of conventional photorecording media containing the transition metal complex of the formula (I), which is not coordinate bonded with the sulfur compound, is significantly affected by the ultraviolet ray irradiation due to the deterioration of the complex.

EXAMPLES

The present invention will be further explained by the following examples.

Example 1 (Synthesis of Dodecyl Mercaptan-Coordinate Bonded Cyanine Dye Complex)

In accordance with the method disclosed in Japanese Unexamined Patent Publication No. 62-14,344, a cyanine dye complex was prepared by reacting 5.0 g (0.01 mole) of 1,3,3,1′,3′,3′-hexamethylindolynotricarbocyanineiodide (available under the trademark of NK-125, from Nihon Kankoshikiso Kenkyusho) with 7.8 g (0.01 mole) of bis(3,5,6-trichloro-1,2-dithiophenolate) nickel (II) tetra-n-butyl ammonium salt (available under the trademark of PA-1006, from Mitsuitoatsu K.K.). The cyanine dye complex in an amount of 1.02 g (1 mmole) and dodecyl mercaptan in an amount of 0.20 g (1 mmole) were dissolved in chloroform in an amount of 50 ml, and the solution was stirred at room temperature for 8 hours, for the coordinate bonding reaction. Then, chloroform was removed from the resultant reaction mixture by evaporation, and the resultant dark black powder was washed with ethyl alcohol to remove non-reacted dodecyl mercaptan.

The resultant nickel complex was dissolved in acetonitrile. This solution was subjected to a liquid chromatography using a liquid chromatographic device (available under the trademark of SPD-M6A, from Shimazu Seisakusho, a column containing a silica gel (available under the trademark of TSK-GEL-OH120, from Toyo Soda K.K.), and an eluent consisting of a mixture of 80% by volume of $CHCl_3$ and 20% by volume of $CH_3CN$, at a flow rate of 1.0 ml/min at a detecting wavelength of 200 to 670 nm. As a result of the analysis, a main peak in the liquid chromatography was observed at a retention time of 3.2 minutes, and a slight side peak due to an NK-125 - PA-1006 complex not coordinate-bonded with the sulfur compound was found at a retention time of 4.2 minutes.

By connecting two of the columns to each other, the fraction corresponding to the main peak at the retention time of 3.2 minutes was isolated and collected. The collected fraction was subjected to measurements of the infrared absorption spectrum (mixed with KBr), nuclear magnetic resonance spectrum ($H^1NMR$), and an element analysis.

In the infrared absorption spectrum, it was confirmed that an absorption at a frequency of 2569 $cm^{-1}$ due to thiol radicals was lost, and an absorption intensity at 2873 $cm^{-1}$ due to the methylene radicals was increased.

The infrared absorption peaks were observed at the following frequencies.

2961, 2931, 2873, 1535, 1469, 1367, 1303, 1275, 1156, 1130, 1079, and 820 $cm^{-1}$ In the nuclear magnetic resonance spectrum ($CDCl_3$), the following absorption peaks ($\delta$, ppm) were observed.

6.69–7.58(10H), 3.80–4.20(12H), 3.72(2H), 1.98–1.43(20H), 1.30–1.38(18H) and 0.82–0.98(3H)

The results of the element analysis were as follows.

Measured (%): C 54.69, H 4.89, N 1.97, S 14.48
Theoretical (%): C 55.08, H 5.11, N 2.42, S 13.86

From the above-mentioned results, it was found that the resultant complex was a coordinate bonding reaction product of dodecyl mercaptan with the cyanine dye complex in a molar ratio of 1:1, of the formula:

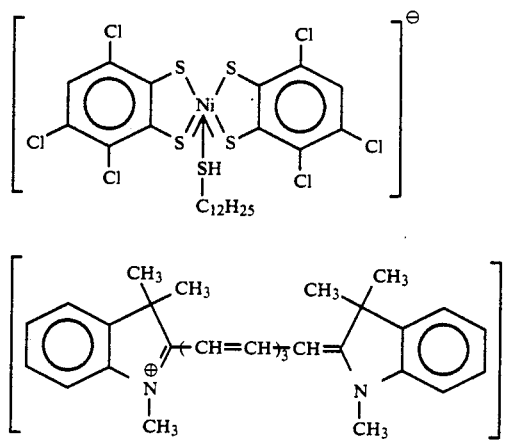

EXAMPLE 2

A mixture of 10 parts by weight of the dodecylmercaptan-coordinate bonded cyanine by complex coloring matter as mentioned in Example 1 with 100 parts by weight of a ultraviolet ray-curable novolak epoxyacrylate resin (available under the trademark of SP-4060, from Showa Kobunshi K.K.), was dissolved in chloroform to provide a solution containing 10% by weight of the mixture.

The solution was coated on a surface of a glass plate substrate to form a coating layer having a thickness of 1.5 μm by a spin coating method. The coated solution layer was dried at a temperature of 80° C. for 10 minutes.

Then ultraviolet rays were irradiated from a high pressure mercury vapor lamp to the resultant dried coating layer with an irradiation energy of 1.2 J/cm² to provide a cured photorecording layer.

It was confirmed that the reduction in absorbance of the coloring matter contained in the cured photorecording layer due to the ultraviolet ray-curing procedure was a very small level of 2% or less.

In the ultraviolet ray curing procedure, the high pressure mercury vapor lamp had a focal intensity of 494 mW/cm² and irradiation was carried out at a distance between the lamp and the coating layer to be cured while moving along the coating layer surface at a speed of 2 m/min for 2 minutes.

The absorbance of the coloring matter measured by a visible spectrometer at a wavelength of 780 nm was 0.310 before the ultraviolet ray irradiation and 0.304 after the ultraviolet ray irradiation. Namely, the reduction in the absorbance was only about 2% or less.

When a semiconductor laser beam was applied at an oscillation wavelength of 830 nm and an initial output of 10 mW in accordance with recording digital signals to the cured photorecording layer, a formation of bumps having a diameter of 1.4 $\mu$m on the photorecording layer surface was clearly recognized.

Then, when a semiconductor laser beam was applied to the recorded photorecording layer at a beam diameter of 5 $\mu$m, an oscillation wavelength of 780 nm, and an output of 7 mW for 6 $\mu$ seconds, the bumps on the photorecording layer were erased and could not be recognized by microscopic observation.

From the results of the above-mentioned experiment, it was confirmed that the above-mentioned photorecording media is usable as a photoinformation-recordable and erasable media.

COMPARATIVE EXAMPLE 1

The same procedures as in Example 2 were carried out except that the dodecylmercaptan-coordinate bonded cyanine dye complex coloring matter was replaced by a corresponding cyanine dye complex coloring matter which was not coordinate bonded with dodecylmercaptan.

It was confirmed that when the ultraviolet ray curing procedure was applied, the comparative coloring matter in the coating layer was significantly deteriorated and discolored. Namely, the absorption of the comparative coloring matter in the coating layer was significantly reduced from 0.315 measured before the ultraviolet ray curing procedure to 0.078 measured after the curing procedure.

COMPARATIVE EXAMPLE 2

A mixture of a polymethylmethacrylate resin with the dodecyl mercaptan-coordinate bonded cyanine dye complex coloring matter of Example 1 in an amount of 10% based on the weight of the resin was admixed with a mixture of the same polymethylmethacrylate resin as mentioned above with the cyanine dye complex coloring matter of the compound No. (22). The admixture was evenly dissolved in chloroform to form a solution having a solid concentration of 8.0% by weight.

A film having a thickness of 1 $\mu$m was prepared from the solution of the admixture by a spin coating method.

The film was continuously irradiated by light from a xenon lamp at an output of 500 W. The intensity of the xenon lamp light on the surface of the film was 60 mW.

It was found that after the xenon lamp light was irradiated for 35 hours, the cyanine dye complex coloring matter of the compound No. (22) was substantially completely discolored, whereas the dodecyl mercaptan-coordinate bonded coloring matter retained an absorbance of 75% based the original absorbance thereof, even after the xenon lamp light irradiation over 2000 hours or more.

From the results of the above-described experiment it was confirmed that the sulfur compound-coordinate bonded organic coloring matter of the present invention exhibits an excellent resistance not only to ultraviolet rays but also to near infrared rays.

EXAMPLE 3

The same procedures for the preparation of the sulfur compound coordinate bonded organic coloring matter as in Example 1 were carried out except that dodecyl mercaptan was replaced by pentaerythritol tetra (3-mercaptopropionate) to coordinate bond with the cyanine dye complex coloring matter.

In the coordinate bonding reaction, the cyanine dye complex coloring matter was mixed with the above-mentioned polyfunctional mercaptan compound and the mixture was heated at a temperature of 70° C. for 60 minutes. The resultant polyfunctional mercaptan-coordinate bonded coloring matter was insoluble in an organic solvent.

Accordingly, in the formation of a photorecording media, the mixture of the cyanine dye complex coloring matter with the polyfunctional mercaptan compound was dissolved in a solvent consisting of chloroform, and the resultant solution was coated on a surface of a substrate of a photorecording media before a precipitate derived from the reaction the cyanine dye complex coloring matter with the mercaptan compound was generated in the solution.

Separately, the reaction product was subjected to the element analysis and the infrared ray absorption spectrum measurement as mentioned in Example 1. It was confirmed that in the reaction product, the polyfunctional mercaptan compound was coordinate bonded to the nickel atom of the cyanine dye complex coloring matter in a molar ratio of 1:1.

In the formation of the photorecording media, the same resinous material as in Example 2 was used. Also, the ultraviolet ray-curing procedure for the coating layer was carried out in the same manner as in Example 2. The resultant cured photorecording layer had a thickness of 2.2 $\mu$m.

When a semiconductor laser beam was irradiated to the cured photorecording layer at an oscillation wavelength of 830 nm at an initial output of 10 mW for 0.24 $\mu$ second, it was clearly recognized that a number of bumps having a diameter of 1.4 $\mu$m were formed on the irradiated photorecording layer.

Then, a semiconductor laser beam was applied to the recorded portion of the photorecording layer at a beam diameter of 5 $\mu$m, an oscillation wavelength of 780 nm, and at an output of 7 mW for 8 $\mu$ seconds. It was confirmed that the bumps on the recorded portion were erased to an extent such that the bumps could not be found by microscopic observation.

Accordingly, it was clear that the above-mentioned photo-recording media was a photo-recordable and erasable optical information-recording media.

EXAMPLE 4

The same procedures as in Example 1 were carried out except that the dodecylmercaptan was replaced by dimethyldisulfide.

In the preparation of the dimethyldisulfide-coordinate bonded coloring matter, one molar part of the cyan dye complex as mentioned in Example 1 was mixed with 1.12 molar part of dimethyldisulfide, and the mixture was subjected to a reaction in a solvent consisting of chloroform at a temperature of 50° C. for 180 minutes.

The resultant coloring matter was isolated from the reaction mixture in the same manner as in Example 1, and subjected to the elemental analysis and infrared ray absorption spectrum measurement.

From the above-mentioned analysis and measurement, it was confirmed that the resultant dimethyldisulfide-coordinate bonded coloring matter was of the following formula:

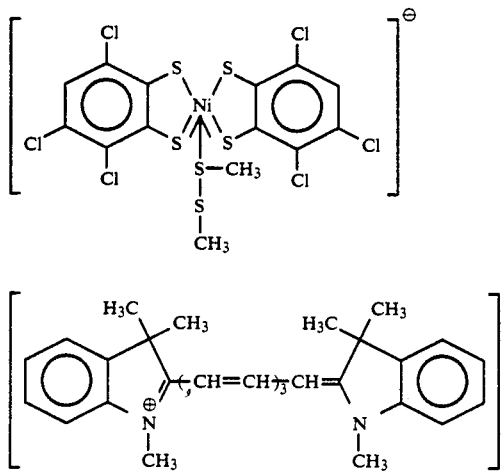

The resultant dimethyldisulfide-coordinate bonded coloring matter was subjected to the same photorecording media-producing procedure as in Example 2.

After the ultraviolet ray-curing procedure, the cured recording layer had a thickness of 2.1 μm.

When a semiconductor laser beam was irradiated to the recording layer at an oscillation wavelength of nm at an initial output of 10 mW for 0.24 μ second. Clear bumps having a diameter of 1.4 μm were formed on the recording layer.

Then when a semiconductor laser beam was irradiated to the bump-formed portion of the recording layer at a beam diameter of 5 μm, at an oscillation wavelength of 780 nm, at an output of 7 mW for 8 μ seconds, the bumps were erased to an extent such that they could not found by microscopic observation.

From the above-mentioned fact, it was confirmed that the resultant photorecording media is photorecordable and erasable.

EXAMPLE 5

The same procedures as in Example 2 were carried out with the following exceptions.

The novolak epoxyacrylate resin used for the photorecording layer was replaced by a cinnamic acid-modified phenoxy resin (available from Union Carbide).

The ultraviolet ray curing procedure was carried out with an irradiation energy of 2.1 J/cm$^2$, and the resultant cured photorecording layer had a thickness of 2.5 μm.

When a recording laser beam was irradiated to the cured photorecording layer at an oscillation wavelength of 830 nm at an output of 10 mW for 60 n seconds, clear bumps having a diameter of 1.0 μm were formed on the photorecording layer. The bumps could be erased by irradiating thereto a semiconductor laser beam at a beam diameter of 5 μm, at an oscillation wavelength of 780 nm at an output of 7 mW for 6 μ seconds, to an extent such that substantially no bump could be recognized by microscopic observations.

Accordingly, the resultant recording media was photo-recordable and erasable.

REFERENTIAL EXAMPLE 1 (Preparation of 3,3'-diallylbisphenol-1,1'-cyclohexylenebisphenol copolycarbonate)

In a four-necked, round bottomed flask having a capacity of liter and equipped with a stirrer, a thermometer, a gas-introducing conduit and a dropping funnel, 0.05 mole of 3,3'-diallylbisphenol A and 0.05 mole of 1,1'-cyclohexylene bisphenol were dissolved in 300 ml of an aqueous solution containing 0.22 mole of sodium hydroxide, while flowing a dried nitrogen gas through the flask. Then, the resultant solution was added with 300 ml of methylene chloride, and phosgene gas in an amount of 0.11 mole was gradually introduced into the mixture over a time of 20 minutes, while cooling the mixture in the flask to a temperature of 20° C. in an ice water bath.

Then, the reaction mixture was heated at a temperature of 33° C., and thereafter, 0.11 mole of phosgene gas was further introduced into the reaction mixture over a time of one hour, while stirring the reaction mixture.

After the above-mentioned operations were completed, the resultant reaction mixture was left to stand for 8 hours, to allow the reaction mixture to be separated into two layers. A resultant methylene chloride solution layer containing the resultant polycarbonate was collected and washed with ion-exchanged water four times.

The polycarbonate had a specific viscosity of 0.58 determined in methyl chloride at a temperature of 20° C.

It was confirmed by a gel-filtration chromatography that the polycarbonate had a number average molecular weight of 57,800.

The polycarbonate was soluble in a solubility of 10% by weight in methylene chloride, chloroform, toluene, tetrahydrofuran and cyclohexanone.

Also, it was confirmed by means of a hydrogen nuclear magnetic resonance spectrum measurement that the polycarbonate was 3,3'-diallylbisphenol-1,1'-cyclohexylenebisphenol copolycarbonate of the formula:

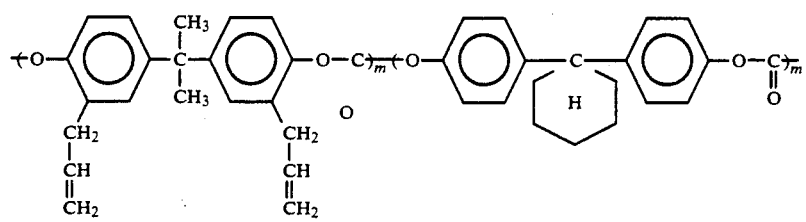

EXAMPLE 6

The same procedures as in Example 2 were carried out with the following exceptions.

In the preparation of the photorecording media, the novolak epoxyacrylate resin for the photorecording layer was replaced by the allyl-substituted polycarbonate resin disclosed in Referential Example 1.

Also, in the preparation of the sulfur compound coordinate bonded organic coloring matter, dodecyl mercaptan was replaced by pentaerythritol tetra(3-mercaptopropionate).

The ultraviolet ray curing procedure was carried out with an irradiation energy of 2.1 J/cm$^2$, and the resultant cured photorecording layer had a thickness of 2.5 μm.

When a recording laser beam was irradiated to the photorecording layer at an oscillation wavelength of 830 nm at an output of 10 mW for 60 n seconds, clear bumps having a diameter of 0.90 μm were formed on the photorecording layer.

Also, when a semiconductor laser beam was applied to the bump-formed portion of the photorecording layer at a beam diameter of 5 μm, at an oscillation wavelength of 780 nm, and an output of 7 mW for 6 μ seconds, the bumps were erased to an extent such that substantially no bump could be formed by microscopic observation.

Accordingly, the above-mentioned photorecording media was photo-recordable and erasable.

EXAMPLES 7 TO 20

In each of Examples 7 to 20, the same procedures as in Example 2 were carried out, with the following exceptions.

The non-sulfur compound-coordinate bonded transition metal complex was prepared by an ion-exchange reaction of the transition metal complex component of the compound No. as shown in Table 1 with the coloring matter component of the compound No. as shown in Table 1.

The resultant transition metal complex was coordinate bonded with pentaerythritol tetra(3-mercaptopropionate) in a molar ratio of 1:1.

The resultant sulfur compound-coordinate bonded organic coloring matter was mixed in an amount of 10 phr with the allyl-substituted polycarbonate resin as mentioned in Referential Example 1.

In the laser beam recording operation, a recording laser beam was irradiated to the photorecording media at an oscillation wavelength of 830 nm at an output of 10 mW at a frequency of 3 MHz (Duty ratio: 50) for 167 n seconds while rotating the recording media at a linear speed of 1.5 m/sec. Clear bumps were formed on the recording layer. The recorded signals had a very high CNR as shown in Table 1.

When a semiconductor laser beam was continuously applied to the bump rows on the recording media at a beam diameter of 1.2 μm, at an oscillation wavelength of 780 nm and an output of 7 mW while rotating the recording media at a linear speed of 3 m/sec, the CNR of the recording layer was reduced to a level of from 10 dB to 15 dB. Also, the bumps were erased to an extent such that substantially no bump was found by microscopic observation.

Accordingly, it was confirmed that the photorecording media was capable of being continuously recorded and erased while rotating the media.

TABLE I

| Example No. | Type of transition metal complex component (Compound No.) | Type of coloring matter component (Compound No.) | Record CNR (dB) |
|---|---|---|---|
| 7 | (4) | (26) | 48 |
| 8 | (4) | (28) | 50 |
| 9 | (4) | (30) | 51 |
| 10 | (4) | (33) | 49 |
| 11 | (4) | (35) | 50 |
| 12 | (4) | (45) | 51 |
| 13 | (4) | (46) | 53 |
| 14 | (4) | (50) | 52 |
| 15 | (6) | (22) | 49 |
| 16 | (8) | (22) | 55 |
| 17 | (10) | (22) | 49 |
| 18 | (14) | (22) | 55 |
| 19 | (19) | (22) | 49 |
| 20 | (20) | (22) | 55 |

Item: Constitution of non-sulfur compound-coordinate bonded transition metal complex

EXAMPLE 21

An ultraviolet ray-curable resin was prepared by mixing a liquid chloroprene rubber provided with hydroxyl group attached to terminals of molecular chains and having a number average molecular weight of 5,100, which rubber was available under the trademark of FH-050 from Denki Kagaku Kogyo K. K., with a polyisocyanate available under the trademark of Coronate L from Nihon Urethane Kogyo K. K., in a molar ratio of hydroxyl groups in the chloroprene rubber to isocyanate groups in the polyisocyanate, of 0.5:1.

The resinous mixture was diluted five times with chloroform.

The mixed resin solution was added with a polymethine coloring matter salt of the compound No. (46) in an amount of 9% based on the total weight of the mixed resin, which polymethine coloring matter salt was available under the trademark of IR 820, from Nihon Kayaku K. K.

The resultant solution coated on a surface of a glass plate and the coated solution layer was dried by evaporating chloroform.

The dried film layer was heat treated at a temperature of 120° C. for one hour in a dryer to cross-link the resin. The resultant cross-linked film layer had a thickness of 3.0 μm. This layer will be referred to as an expansion layer hereinafter.

The same mixture as mentioned in Example 6 comprising the allyl-substituted polycarbonate resin and the pentaerythritol tetra (3-mercaptopropionate)-coordinate bonded coloring matter was coated on the expansion layer to form a coating layer having a thickness of 1.0 μm.

The coating layer was cured by ultraviolet ray irradiation in the same manner as in Example 5 to form a record-holding layer.

When a semiconductor laser beam was irradiated to the record-holding layer at an oscillation wavelength of 830 nm at an initial output of 10 mW for 140 n seconds. Clear bumps with a diameter of 1.1 μm were formed on the record-holding layer.

Then, when a semiconductor laser beam was irradiated to the bump-formed portion of the record-holding layer at an oscillation wavelength of 780 nm and an initial output of 5 mW for 4 μ seconds, it was confirmed that the bumps were erased to an extent such that substantially no bump could be found on the record-holding layer by microscopic observation.

Accordingly, it is clear that the recording media is usable as a recordable and erasable media for optical information.

EXAMPLE 22

The same procedures as in Example 21 were carried out with the following exceptions.

In the preparation of the expansion layer, the chloroprene rubber-polyisocyanate mixed resin was replaced by a mixture of a photocurable difunctional urethaneacrylate oligomer available under the trademark of U-122A from Shin Nakamura Kagaku K. K. with a photocurable hexafunctional urethaneacrylate oligomer available under the trademark of U-1226A, from Shin Nakamura Kagaku K. K. in a mixing weight ratio of 4:6.

When the same recording operation as in Example 21 was applied to the resultant cured recording layer, clear bumps having a diameter of 1.2 μm were formed on the record-holding layer.

When the same erasing operation as in Example 22, except that the irradiation time was 3 μ seconds, was applied to the bump-formed portion of the record-holding layer, the bumps were erased to an extent that substantially no bump could be found by microscopic observation.

Accordingly, the above-mentioned media was usable as a photo-recordable and erasable optical information-recording media.

EXAMPLES 23 TO 26

In each of Examples 23 to 26, the same procedures as in Example 1 were carried out with the following exceptions.

The resins used for the preparation of the expansion layer and the record-holding layer were those as shown in Table 2, respectively.

The CNR of the resultant record is also shown in Table 2.

TABLE 2

| Example No. | Type of resin Record-holding layer | Expansion layer | Record CNR (dB) |
|---|---|---|---|
| Example 23 | Ally-substituted polycarbonate resin (*)$_1$ | Urethaneacrylate resin (*)$_2$ | 55 |
| Example 24 | Polymethylmethacrylate resin | Urethaneacrylate resin (*)$_2$ | 56 |
| Example 25 | Novolak epoxy-acrylate resin (*)$_3$ | Urethaneacrylate resin (*)$_2$ | 53 |
| Example 26 | Cinnamic acid-modified phenoxy resin (*) | Urethaneacrylate resin (*)$_2$4 | 54 |

Note:
(*)$_1$ same as in Example 6
(*)$_2$ same as in Example 22
(*)$_3$ same as in Example 2
(*)$_4$ same as in Example 5

The recording media of Examples 23 to 26 exhibited a high sensitivity and were useful as photo-recordable and erasable optical information-recording media.

EXAMPLE 27

A plain weave was produced from cationic dye-dyable polyethylene phthalate filament yarns containing at least 5.0 molar % of copolymerized sodium 5-sulfoisophthalate and having a yarn count of 50 denier/36 filaments.

This fabric was scoured and pre-heat set in a customary manner and then dyed under the following conditions.

| Dyeing aqueous liquor: | |
|---|---|
| Based Red 12 (*)$_5$ | 3% by weight |
| Na$_2$SO$_4$ | 6 g/l |
| CH$_3$COOH | 0.4 g/l |
| Dyeing condition | |
| Temperature: | 120° C. |
| Time: | 60 minutes |

Note: (*)$_5$ C.I. 48070, available under the trademark of Aizen Astra Phloxine FF conc., from Hodogaya Kagaku K.K.

The resultant red colored fabric A was dried, and immersed in a solution of 0.2% by weight of the polyfunctional mercaptan-coordinate bonded coloring matter as mentioned in Example 2 in acetone at room temperature for 30 minutes. The fabric impregnated with the coloring matter solution was squeezed by a mangle in a customary manner, dried at a temperature of 100° C. for 4 minutes, and heat treated at a temperature of 160° C. for one minute.

The resultant treated fabric B was subjected to a measurement of a light fastness in accordance with Japanese Industrial Standard (JIS) L 0842-71, by using a carbon arc lamp at a temperature of 63° C. for 20 hours.

The light fastness of the treated fabric was evaluated by using a blue scale in accordance with JIS L 0841-66.

The color value L* of the treated fabric B was measured in accordance with JIS Z 8729-1980 and calculated in accordance with JIS Z 8701-1980.

For comparison, the color value L* and the light fastness of the dyed fabric A were determined in the above-mentioned manner.

The results are shown in Table 3.

TABLE 3

| | Item | |
|---|---|---|
| Fabric | Color value L* | Light fastness (class) |
| Dyed fabric A (Comparative) | 35.2 | 1-2 |
| Treated fabric B | 26.8 | 4-5 |

Table 3 clearly shows that the color of the dyed fabric A was deepened by the treatment with the sulfur compound-coordinate bonded coloring matter of the present invention, and the resultant treated fabric B exhibited a greatly enhanced light fastness in comparison with that of the dyed fabric A.

We claim:

1. A sulfur compound-coordinate bonded organic coloring compound with a high resistance to ultraviolet rays comprising a coordinate bonding reaction product of a transition metal complex of the formula (I):

$$B^{-n} \cdot A^{+n} \quad (I)$$

wherein n represents zero or an integer of 1 or 2, A represents a cation moiety when n is 1 or 2, but when n is zero, no cation moiety A exists, and B represents an anion moiety of the formula (II):

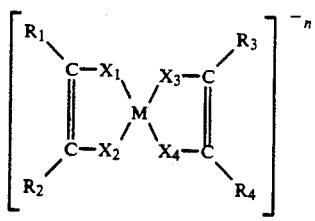

in which $X_1$, $X_2$, $X_3$ and $X_4$ respectively and independently from each other represent a member selected from the group consisting of sulfur, oxygen, SH, NH and $NH_2$; $R_1$, $R_2$, $R_3$ and $R_4$ respectively and independently from each other represent a member selected from the group consisting of unsubstituted and substituted phenyl radicals, a cyano radical, alkyl radicals, and groups of the formulae:

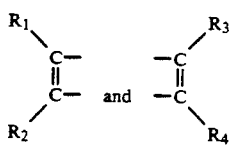

being respectively and independently from each other, cyclized to form a cyclic structure selected from the group consisting of unsubstituted and substituted phenylene and unsubstituted and substituted naphthylene structures and divalent heterocyclic structures selected from the group consisting of

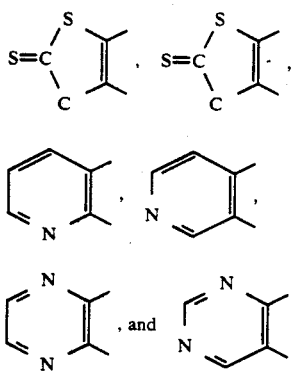

and M represents a transition metal atom having a coordinate number of at least 4, with an organic sulfur compound having at least one ligand group selected from the group consisting of mercapto and disulfide groups, in which reaction product the transition metal atom M in the compound of the formula (I) is coordinate-bonded with at least one of the ligand groups of the organic sulfur compound.

2. The organic coloring compound of claim 1, wherein the cation moiety A in the formula (I) is selected from the group consisting of cyanine dye compound cations, polymethine dye compound cations, pyrylium compound cations, thiapyrylium compound cations and aminium dye compound cations.

3. The organic coloring compound of claim 1, wherein the transition metal atom M in the formula (II) is selected from the group consisting of Ni, Co, Pt, Pd, Fe, Zn and Cu atoms.

4. The organic coloring compound of claim 1, wherein the sulfur compound is selected from the group consisting of alkyl mercaptan, aralkyl mercaptan, dimercaptoalkanes, 1,4-dimercapto-2,3-budanediol, di(2-mercaptoethyl)ether, 2,3-dimercapto-1-propanol, 2,3-dimercapto succinic acid, pentaerythritol tetra(3-mercaptoacetate), pentaerythritol tetra(3-mercaptopropionate), dialkylsulfides, 2-mercaptobenzothiazole, dibenzothiazyldisulfide, tetramethylthiuramdisulfide, tetraethylthiuramdisulfide, tetrabutylthiuramdisulfide, 2-mercaptomethyl benzimidazole, 2-mercaptobenzimidazole, 4,4'-dithiomorpholine, and o,o'-dibenzamidodiphenyldisulfide.

5. A compound of claim 1 wherein at least one of $R_1$, $R_2$, $R_3$ and $R_4$ is independently selected from the group consisting of phenyl, alkylphenyl, aminophenyl, alkoxyphenyl, chlorophenyl, and alkylaminophenyl.

6. A compound of claim 1 wherein the alkyl radical contains 1 to 4 carbon atoms.

7. A compound of claim 1 wherein at least one of the groups

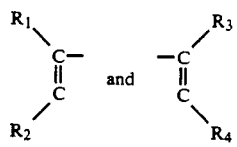

is independently selected from phenylene and substituted phenylene.

8. A compound of claim 1 wherein at least one of the groups

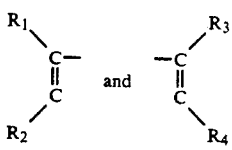

is independently selected from the group consisting of naphthalene and substituted naphthalene.

9. A compound of claim 7 wherein the phenylene group is substituted with at least one member selected from the group consisting of —Cl, —CH₃, —N(CH₃)₂, —OCH₃, —NH₂ and —C₂H₅.

10. A compound of claim 8 wherein the naphthalene group is substituted with at least one member selected from the group consisting of —Cl, —CH₃, —N(CH₃)₂, —N(C₂H₅)₂, —OCH₃, —NH₂ and —C₂H₅.

11. A compound of claim 1 wherein B is a member selected from the group consisting of

| Compound No. | Formula |
|---|---|
| | (structure: dichlorophenyl-S₂-Ni-S₂-dichlorophenyl complex) |
| | (structure: tetrachlorophenyl-S₂-Ni-S₂-tetrachlorophenyl complex) |

-continued
| Compound No. | Formula |
| --- | --- |
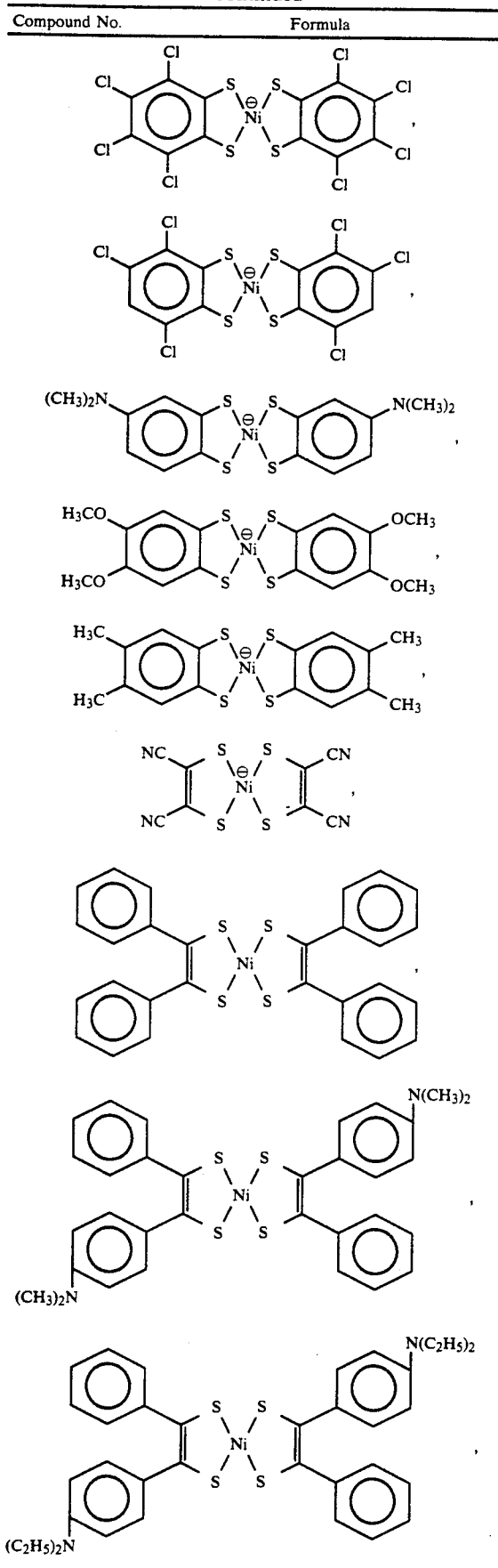
-continued
| Compound No. | Formula |
| --- | --- |
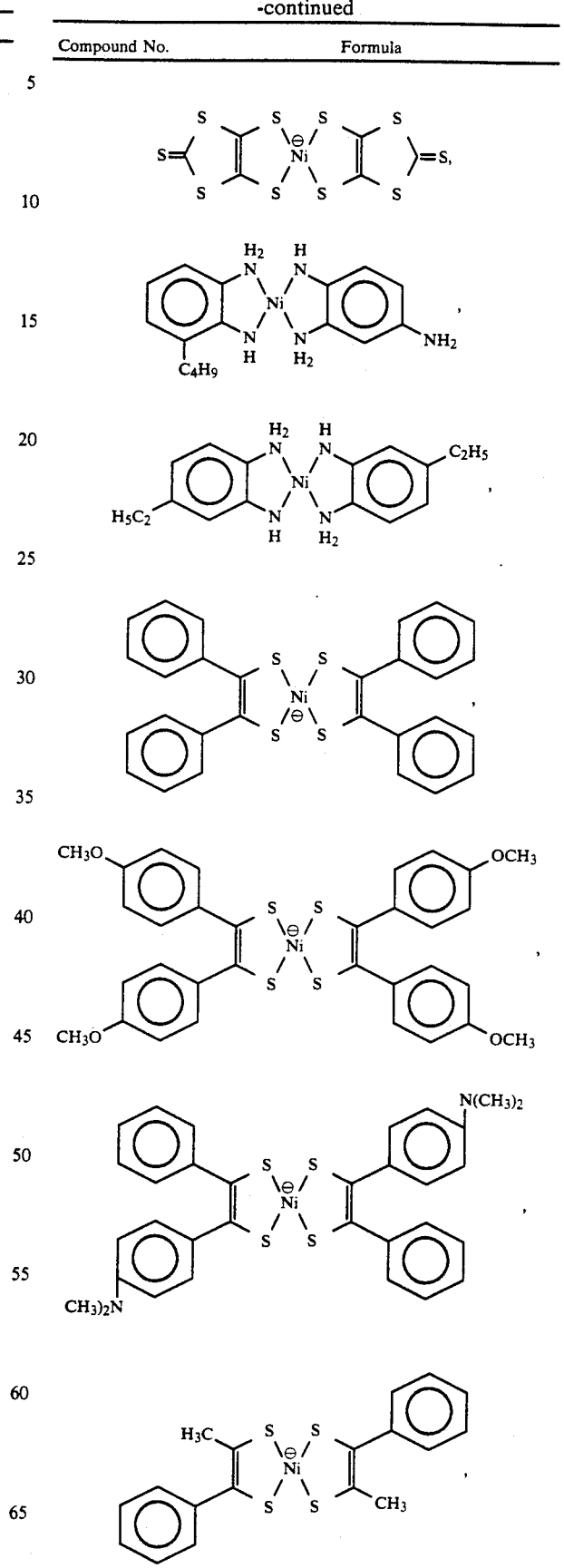

-continued
| Compound No. | Formula |
|---|---|
| | 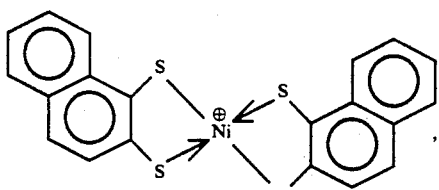 |
| | 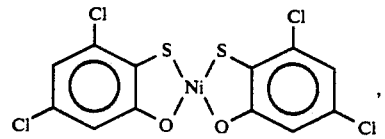 |
-continued
| Compound No. | Formula |
|---|---|
| 5 | and |
| 10 | 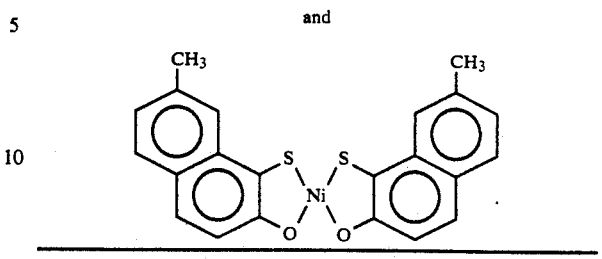 |
12. A compound of claim 11 wherein A is a compound selected from the group consisting of
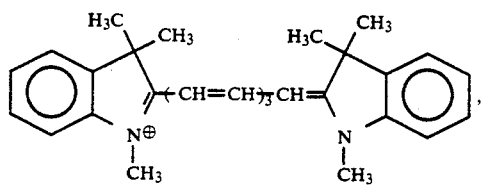
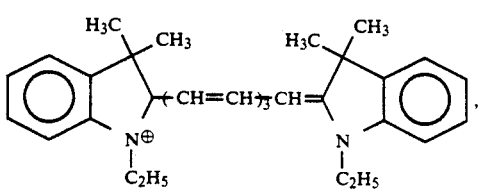
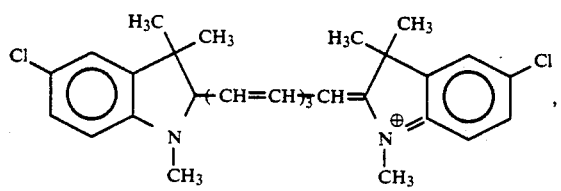
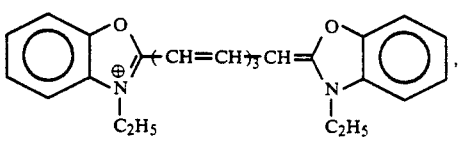
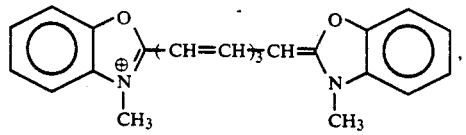
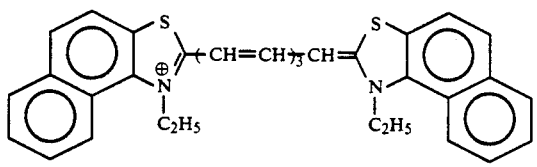
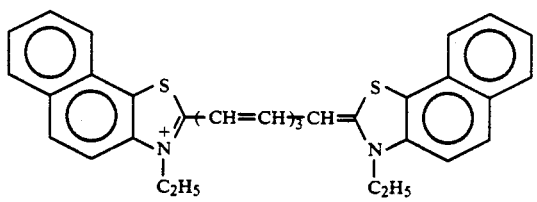
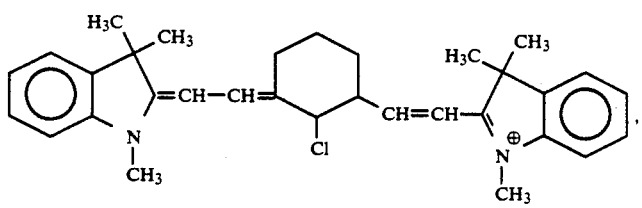
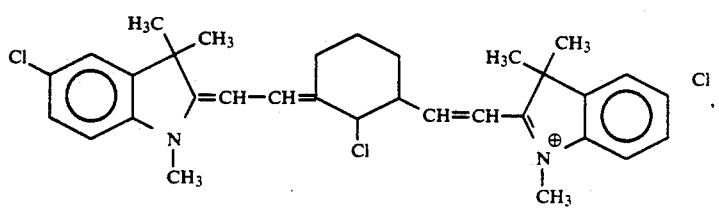

-continued
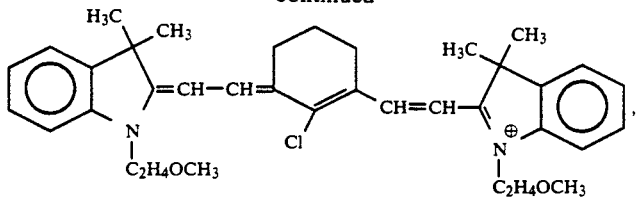
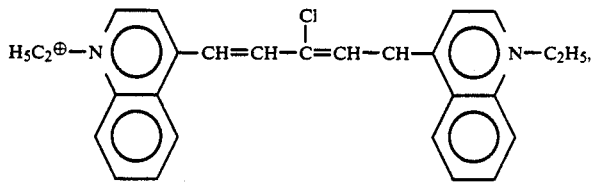
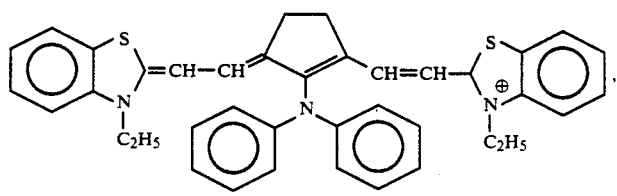
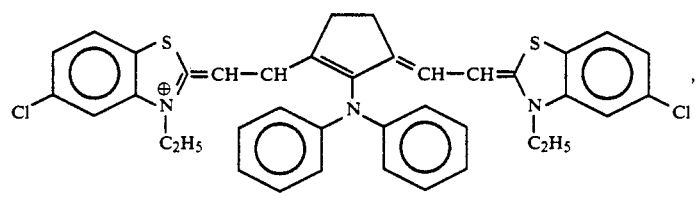
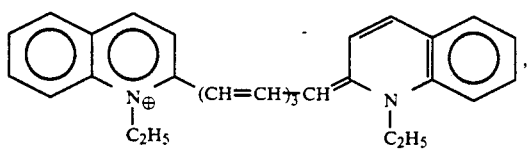
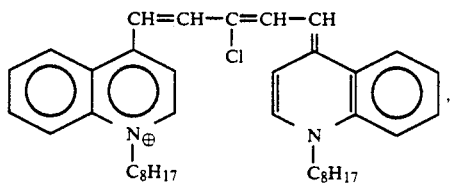
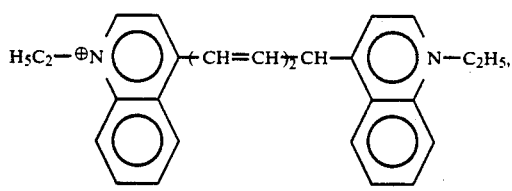
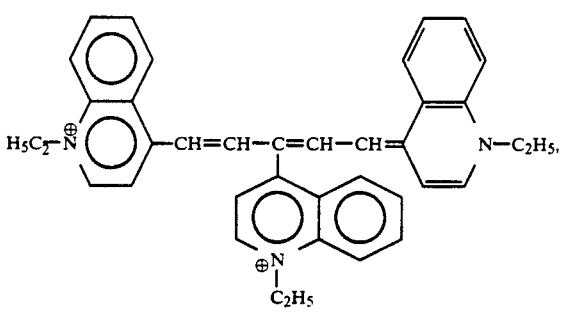
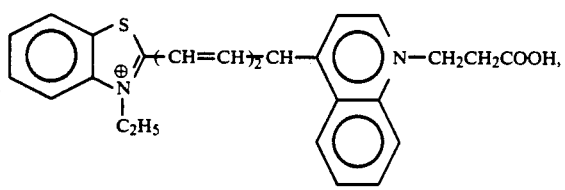
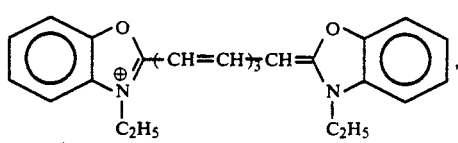
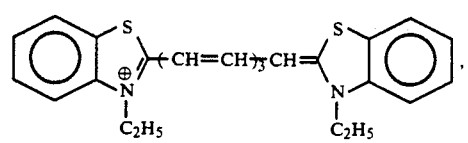
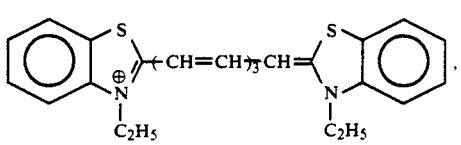

-continued
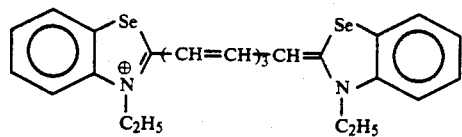 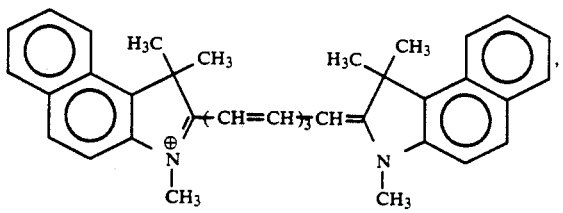
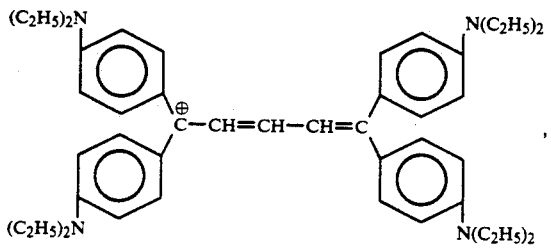 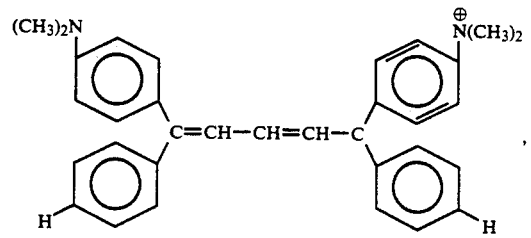
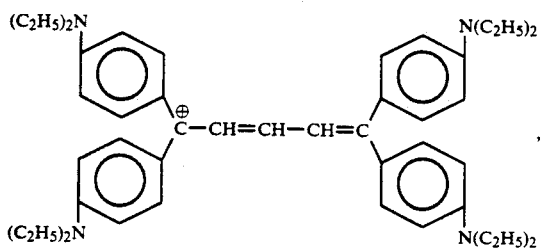 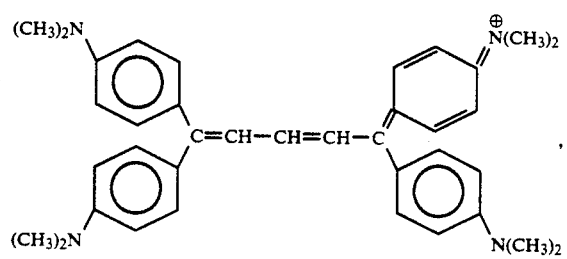
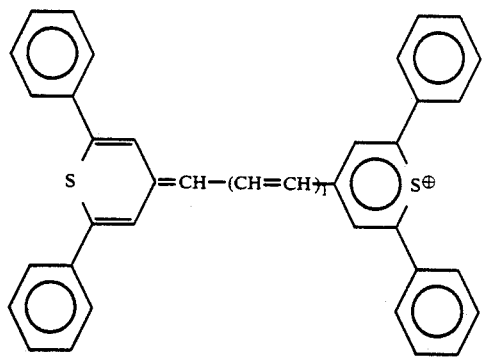 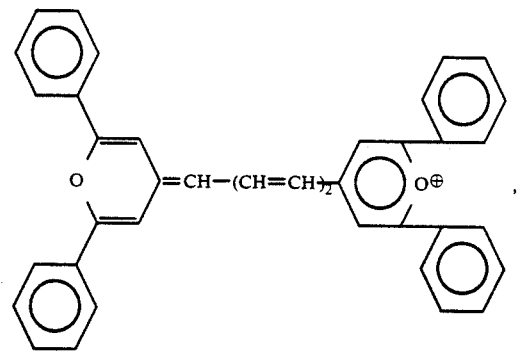
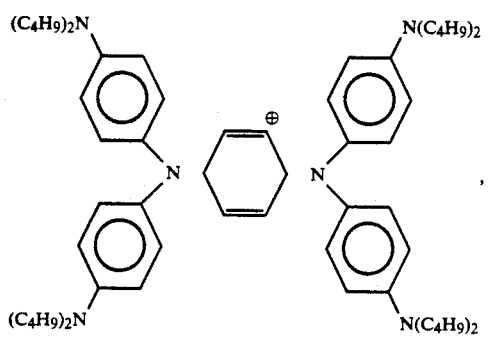 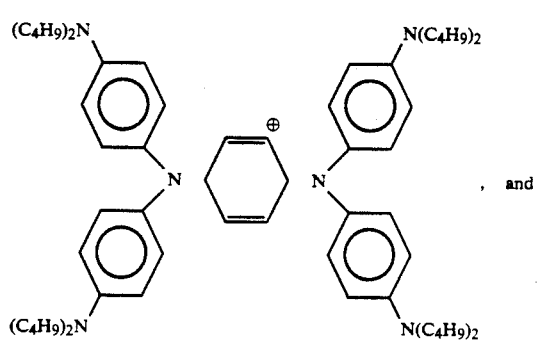, and

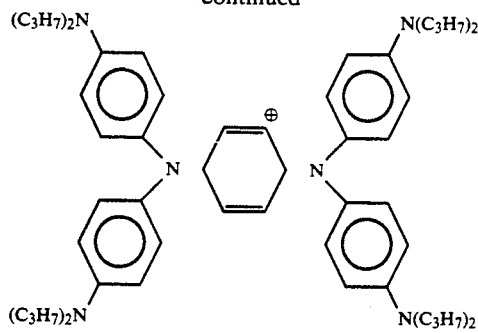

13. A compound of claim 11 wherein the sulfur compound is selected from the group consisting of alkyl mercaptans, aralkyl mercaptans, dimercaptoalkanes, 1,4-dimercapto-2,3-butanediol, di(2-mercaptoethyl) ether, 2,3-dimercapto-1-propanol, 2,3-dimercapto succinic acid, pentaerythritol tetra(3-mercaptoacetate), pentaerythritol tetra(3-mercaptopropionate), dialkylsulfides, 2-mercaptobenzothiazole, dibenzothiazyldisulfide, tetramethylthiuramdisulfide, tetraethylthiuramdisulfide, tetrabutylthiuramdisulfide, 2-mercaptomethyl benzimidazole, 2-mercaptobenzimidazole, 4,4'-dithiomorpholine, and o,o'-dibenzamidodiphenyldisulfide.

14. A compound of claim 12 wherein the sulfur compound is selected from the group consisting of alkyl mercaptans, aralkyl mercaptans, dimercaptoalkanes, 1,4-dimercapto-2,3-butanediol, di(2-mercaptoethyl) ether, 2,3-dimercapto-1-propanol, 2,3-dimercapto succinic acid, pentaerythritol tetra(3-mercaptoacetate), pentaerythritol tetra(3-mercaptopropionate), dialkylsulfides, 2-mercaptobenzothiazole, dibenzothiazyldisulfide, tetramethylthiuramdisulfide, tetraethylthiuramdisulfide, tetrabutylthiuramdisulfide, 2-mercaptomethyl benzimidazole, 2-mercaptobenzimidazole, 4,4'-dithiomorpholine, and o,o'-dibenzamidodiphenyldisulfide.

15. A compound of claim 11 wherein the transition metal M is selected from the group consisting of Ni, Co, Pt, Pd, Fe, Zn and Cu atoms.

16. A compound of claim 12 wherein the transition metal is selected from the group consisting of Ni, Co, Pt, Pd, Fe, Zn and Cu atoms.

17. A compound of claim 12 wherein B is a member selected from the group consisting of

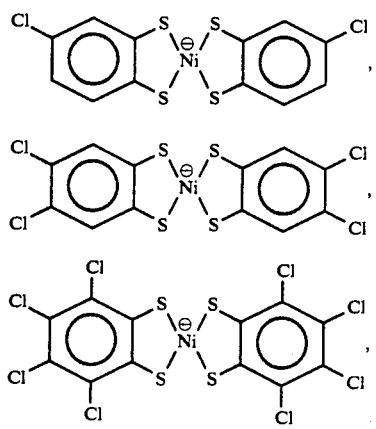

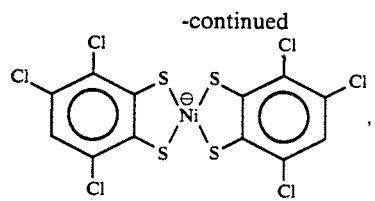

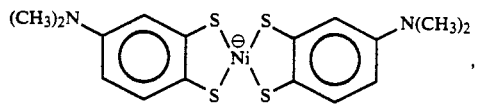

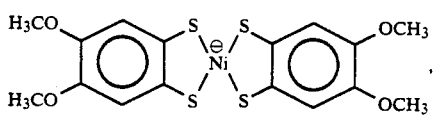

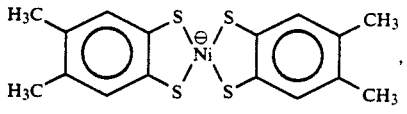

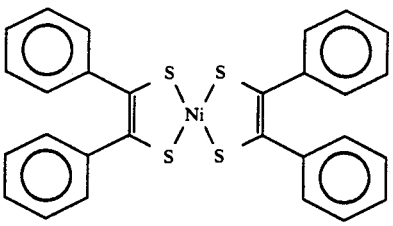

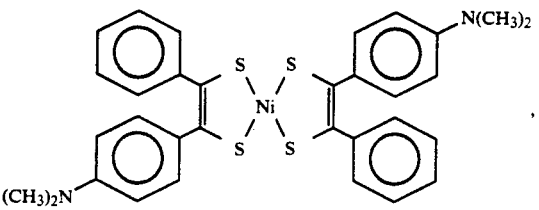

-continued

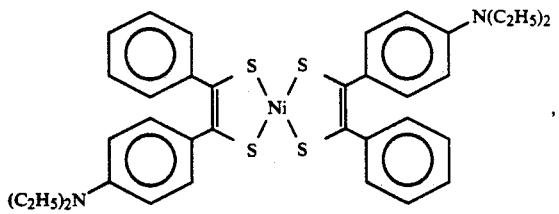

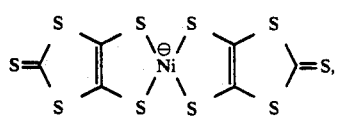

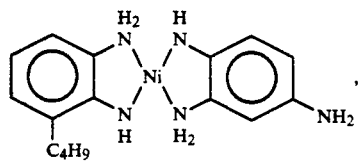

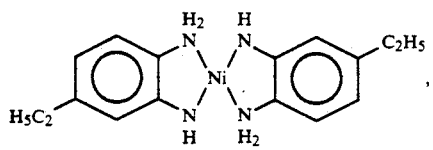

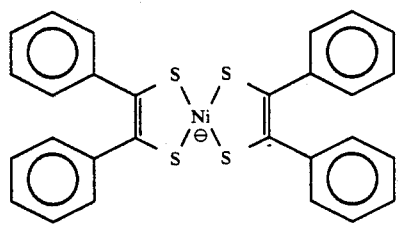

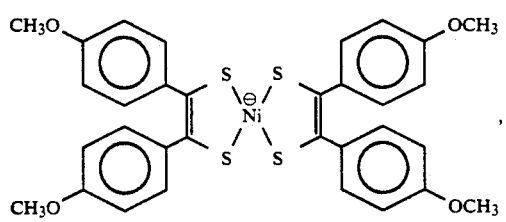

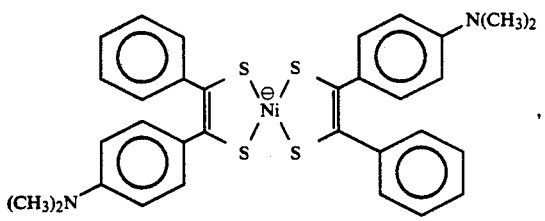

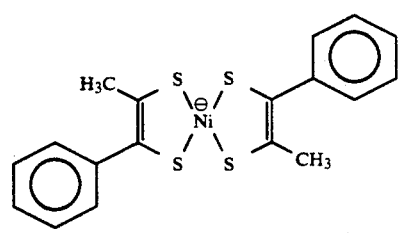

-continued

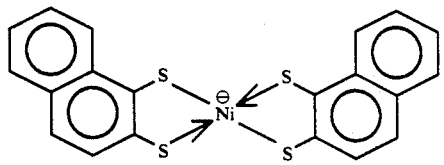

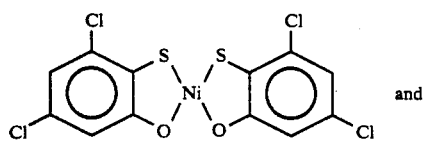
and

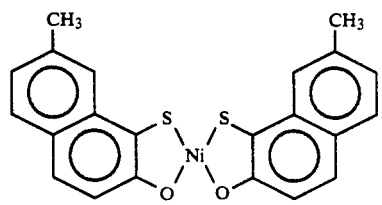

18. A sulfur compound coordinate bonded organic coloring composition of claim 17 wherein the transition metal is selected from the group consisting of Ni, Co, Pt, Pd, Fe, Zn, and Cu.

19. A compound of claim 1 wherein in B, the

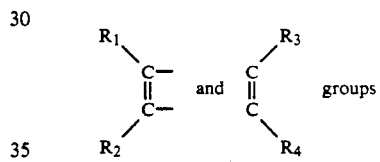 groups are cyclized to form a cyclic structure independently selected from the group consisting of phenylene, substituted phenylene, naphthalene and substituted naphthalene.

20. A compound of claim 19 wherein the cyclic structure is substituted with at least one member selected from the group consisting of —Cl, —CH$_3$, —N(CH$_3$)$_2$, —N(C$_2$H$_5$)$_2$, —OCH$_3$, —NH$_2$, and —C$_2$H$_5$.

21. A compound of claim 20 wherein M is selected from the group consisting of Ni, Co, Pt, Pd, Fe, Zn and Cu and A is selected from the group consisting of cyamedye compound cations, polymethane dye compound cations, pyrylium compound cations, thiapyrgluim compound cations, and aminium dye compound and the organic sulfur compound is selected from the group consisting of alkyl mercaptans, aralkyl mercaptans, dimercaptoalkanes, 1,4-dimercapto-2,3-butanediol, di(2-mercaptoethyl) ether, 2,3-dimercapto-1-propanol, 2,3-dimercapto succinic acid, pentaerythritol tetra(3-mercaptoacetate), pentaerythritol tetra(3-mercaptopropionate), dialkylsulfides, 2-mercaptobenzothiazole, dibenzothiazyldisulfide, tetramethylthiuramdisulfide, tetraethylthiuramdisulfide, tetrabutylthiuramdisulfide, 2-mercaptomethyl benzimidazole, 2-mercaptobenzimidazole, 4,4'-dithiomorpholine, and o,o'-dibenzamidodiphenyldisulfide.

22. A compound of claim 19 wherein the cyclic structure is independently selected from the group consisting of phenylene and substituted phenylene.

23. A compound of claim 22 wherein the phenylene is substituted with at least one member selected from the group consisting of —Cl, —CH₃, —N(CH₃)₂, —N(C₂H₅)₂, —OCH₃, —NH₂, and —C₂H₅.

24. A compound of claim 19 wherein A is a cyamine dye compound cation.

25. A compound of claim 22 wherein A is a cyamine dye compound cation.

26. A compound of claim 25 wherein the phenylene is substituted with chloro.

27. A compound of claim 26 wherein A is

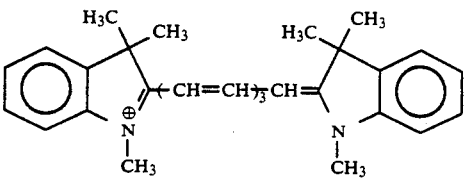

28. A compound of claim 27 wherein the sulfur compound is selected from the group consisting of

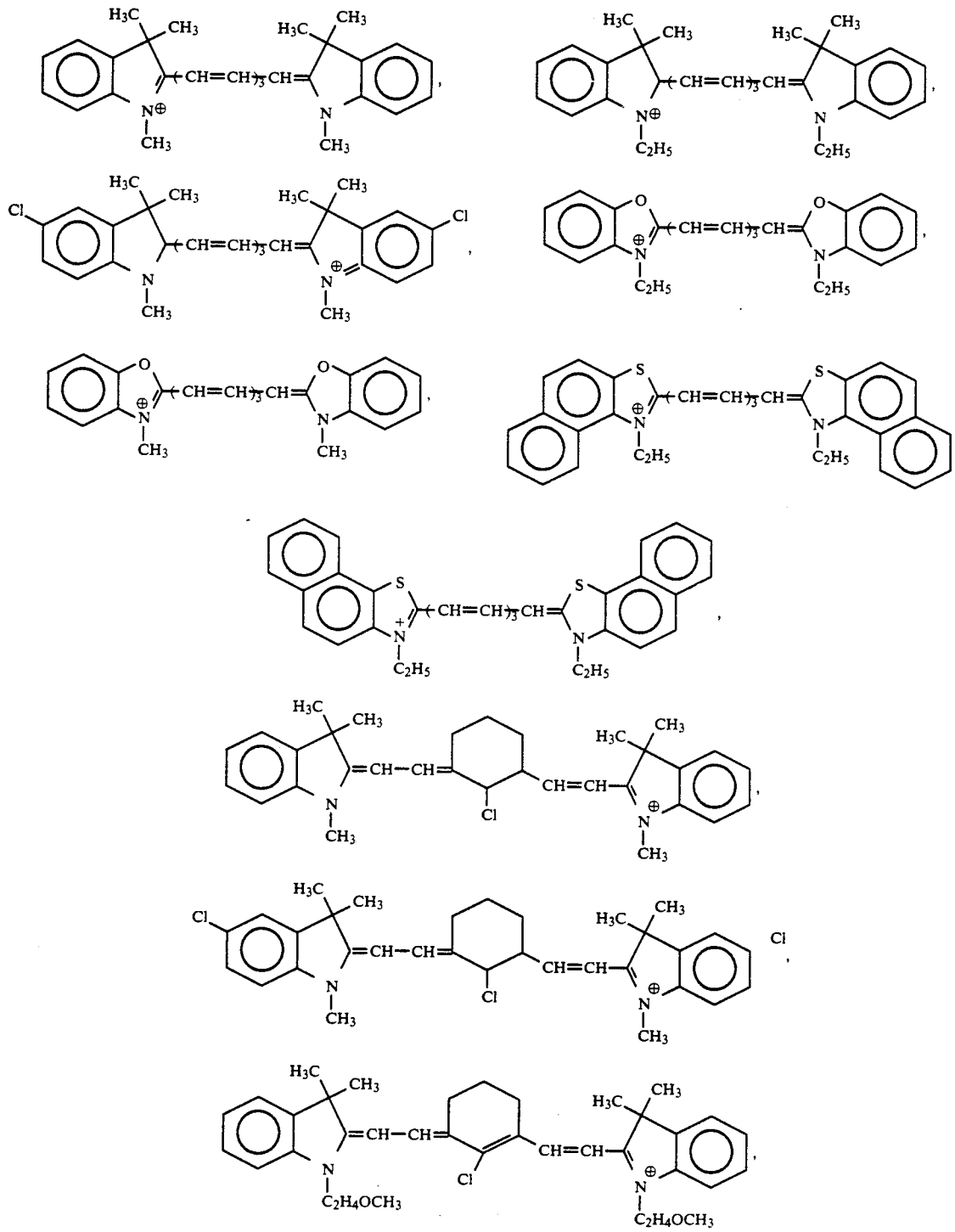

-continued
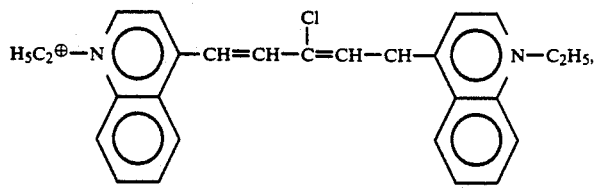
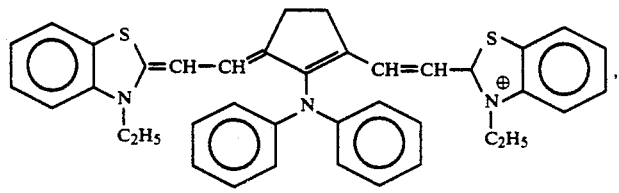
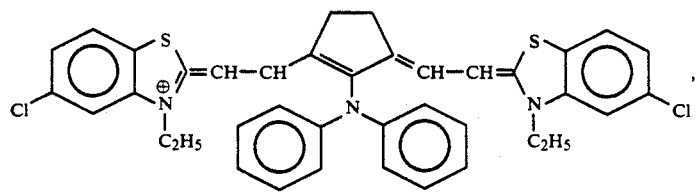
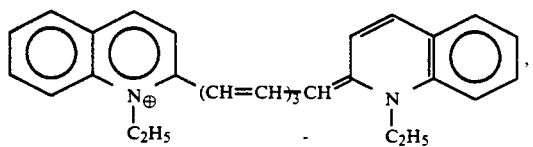
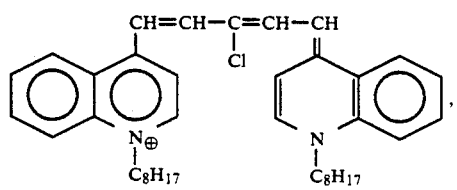
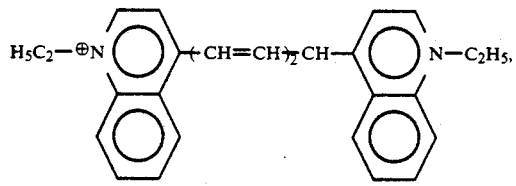
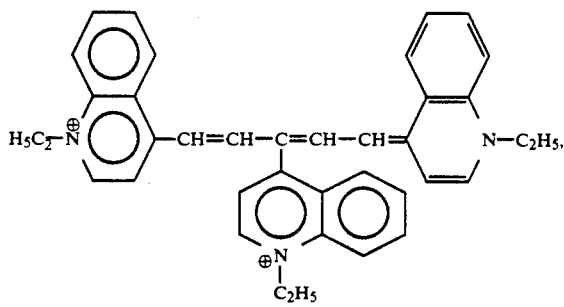
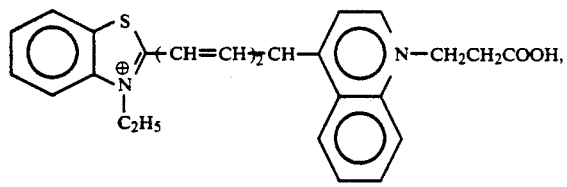
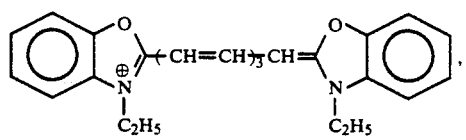
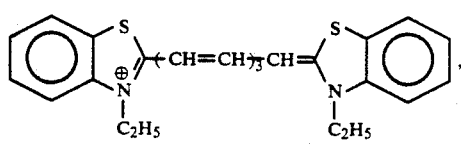
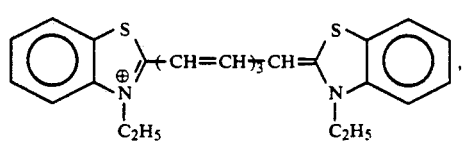

-continued
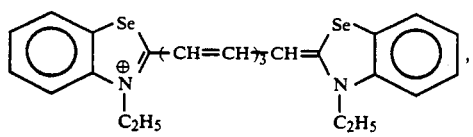
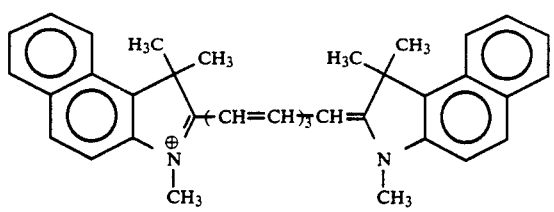
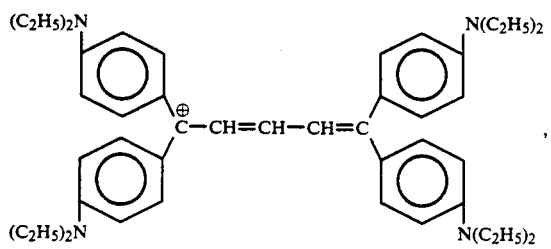
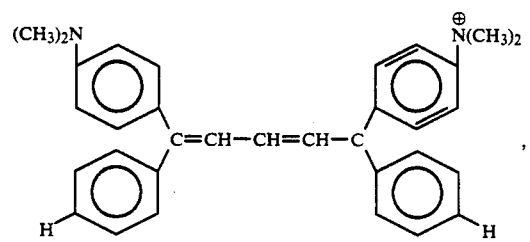
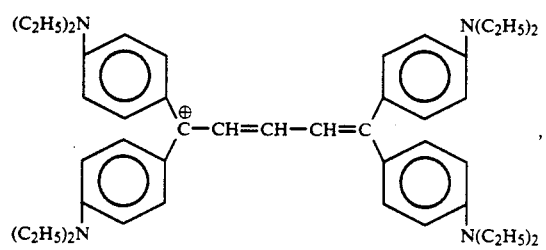
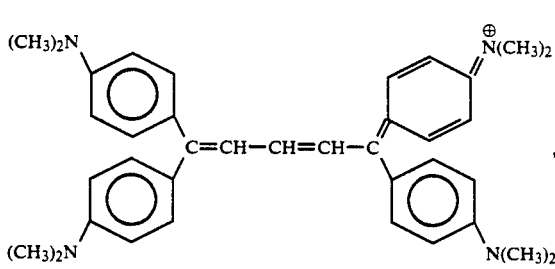
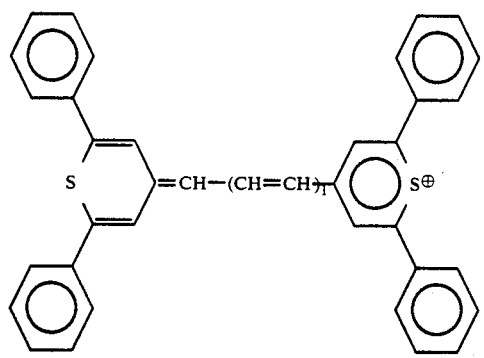
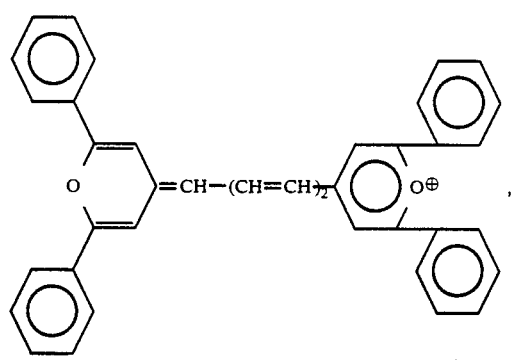
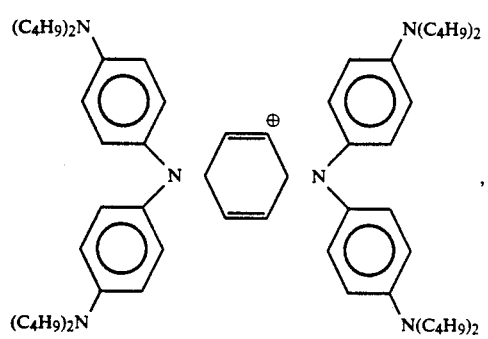
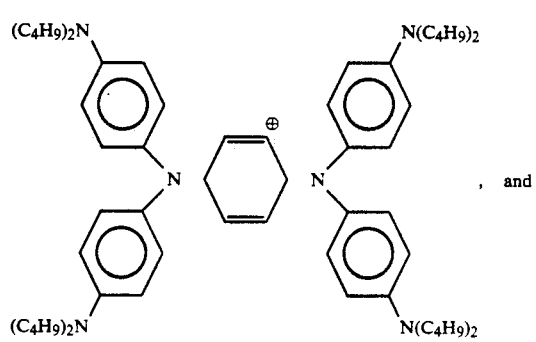, and

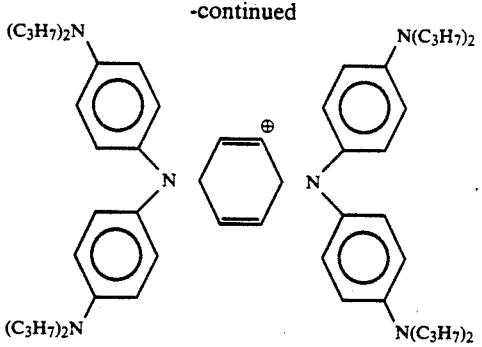

29. A compound of claim 1 of the formula

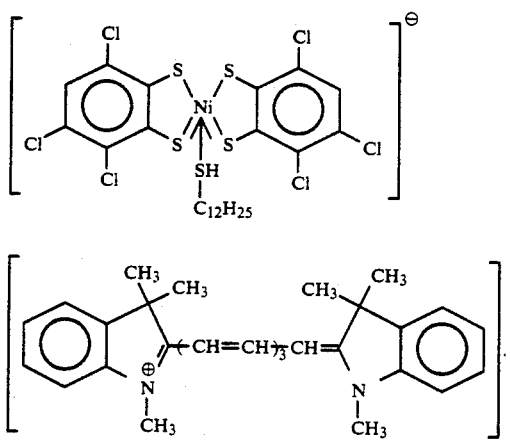

30. A compound of claim 17 wherein the sulfur compound is selected from the group consisting of alkyl mercaptans, aralkyl mercaptans, dimercaptoalkanes, 1,4-dimercapto-2,3-butanediol, di(2-mercaptoethyl) ether, 2,3-dimercapto-1-propanol, 2,3-dimercapto succinic acid, pentaerythritol tetra(3-mercaptoacetate), pentaerythritol tetra(3-mercaptopropionate), dialkylsulfides, 2-mercaptobenzothiazole, dibenzothiazyldisulfide, tetramethylthiuramdisulfide, tetraethylthiuramdisulfide, tetrabutylthiuramdisulfide, 2-mercaptomethyl benzimidazole, 2-mercaptobenzimidazole, 4,4'-dithiomorpholine, and o,o'-dibenzamidodiphenyldisulfide.

31. A compound of claim 27 wherein the sulfur compound is selected from the group consisting of alkyl mercaptans, aralkyl mercaptans, dimercaptoalkanes, 1,4-dimercapto-2,3-butanediol, di(2-mercaptoethyl) ether, 2,3-dimercapto-1-propanol, 2,3-dimercapto succinic acid, pentaerythritol tetra(3-mercaptoacetate), pentaerythritol tetra(3-mercaptopropionate), dialkylsulfides, 2-mercaptobenzothiazole, dibenzothiazyldisulfide, tetramethylthiuramdisulfide, tetraethylthiuramdisulfide, tetrabutylthiuramdisulfide, 2-mercaptomethyl benzimidazole, 2-mercaptobenzimidazole, 4,4'-dithiomorpholine, and o,o'-dibenzamidodiphenyldisulfide.

* * * * *